(12) United States Patent
Lery

(10) Patent No.: US 10,858,015 B2
(45) Date of Patent: Dec. 8, 2020

(54) RAIL VEHICLE HAVING A DEDICATED AREA FOR RECHARGING LIGHT ELECTRIC VEHICLES

(71) Applicant: Bombardier Transportation GmbH, Berlin (DE)

(72) Inventor: Benoît Lery, Bangkok (TH)

(73) Assignee: Bombardier Transportation GmbH, Berlin (DE)

( * ) Notice: Subject to any disclaimer, the term of this patent is extended or adjusted under 35 U.S.C. 154(b) by 407 days.

(21) Appl. No.: 15/973,836

(22) Filed: May 8, 2018

(65) Prior Publication Data

US 2018/0370386 A1 Dec. 27, 2018

Related U.S. Application Data

(60) Provisional application No. 62/524,076, filed on Jun. 23, 2017.

(51) Int. Cl.
*B61D 3/18* (2006.01)
*B60M 7/00* (2006.01)
(Continued)

(52) U.S. Cl.
CPC ............... *B61D 3/18* (2013.01); *B60L 50/50* (2019.02); *B60L 53/16* (2019.02); *B60L 53/665* (2019.02); *B60L 58/10* (2019.02); *B60M 7/003* (2013.01); *B61D 15/00* (2013.01); *B61D 45/001* (2013.01); *B61D 49/00* (2013.01); *B60L 2200/12* (2013.01); *B60L 2200/26* (2013.01); *B60P 3/07* (2013.01); *B60P 3/073* (2013.01)

(58) Field of Classification Search
CPC . B60L 2200/12; B61D 3/18; B62H 2003/005; Y02T 90/12; Y02T 90/14
See application file for complete search history.

(56) References Cited

U.S. PATENT DOCUMENTS 5,841,351 A * 11/1998 Rey .................... B62H 5/00
340/432
5,917,407 A * 6/1999 Squire .................. B62H 3/00
194/205

(Continued)

FOREIGN PATENT DOCUMENTS

CN 203958159 U 1/2014
CN 104691690 A 6/2016

*Primary Examiner* — Zachary L Kuhfuss
(74) *Attorney, Agent, or Firm* — The Webb Law Firm

(57) ABSTRACT

A rail vehicle includes a car body having both a passenger space and a stowage space that is provided with a controller and at least one station for accommodating light electric vehicles. The stations have a chassis, a holding structure, a locking mechanism, and a power outlet. The holding structure can hold the light electric vehicle stationary. The locking mechanism can retain the light electric vehicle in the holding structure. The power outlet can deliver electrical power to a battery of the light electric vehicle when the light electric vehicle is secured in the holding structure and connected to the power outlet. The power outlet can be connected to an electrical power network of the rail vehicle. The controller can selectively send a release signal to the locking mechanism, so as to release the locking mechanism, and to selectively operate the power outlet so as to deliver the electrical power.

18 Claims, 26 Drawing Sheets

Individual charging bays are positioned onto the vehicle sidewall, mounting to sidewall extrusions. Individual charging bays allow for expandable installations.

(51) Int. Cl.
*B61D 15/00* (2006.01)
*B61D 45/00* (2006.01)
*B61D 49/00* (2006.01)
*B60L 58/10* (2019.01)
*B60L 50/50* (2019.01)
*B60L 53/66* (2019.01)
*B60L 53/16* (2019.01)
B60P 3/073 (2006.01)
B60P 3/07 (2006.01)

(56) References Cited

U.S. PATENT DOCUMENTS

| | | | | |
|---|---|---|---|---|
| 7,726,160 | B2 * | 6/2010 | Gagosz | B62H 5/003 |
| | | | | 70/233 |
| 8,678,205 | B2 * | 3/2014 | Mercat | B62M 6/40 |
| | | | | 211/5 |
| 9,076,136 | B2 * | 7/2015 | Bettez | G07B 15/02 |
| 9,514,588 | B2 * | 12/2016 | Neupert | B60L 53/65 |
| 9,598,128 | B2 * | 3/2017 | Assenat | B62H 3/02 |
| 10,202,161 | B2 * | 2/2019 | Southey | G08G 1/166 |
| 2008/0297108 | A1 * | 12/2008 | Le Gars | B62H 3/00 |
| | | | | 320/109 |
| 2009/0240575 | A1 * | 9/2009 | Bettez | G06Q 20/127 |
| | | | | 705/13 |
| 2010/0228405 | A1 * | 9/2010 | Morgal | G07B 15/00 |
| | | | | 701/2 |
| 2011/0148346 | A1 | 6/2011 | Gagosz et al. | |
| 2015/0321722 | A1 | 11/2015 | Dadoosh et al. | |
| 2016/0090017 | A1 | 3/2016 | Aich et al. | |
| 2018/0370386 | A1 * | 12/2018 | Lery | B61D 49/00 |
| 2020/0031247 | A1 * | 1/2020 | Moravick | B60L 53/31 |
| 2020/0124430 | A1 * | 4/2020 | Bradlow | B62J 99/00 |

\* cited by examiner

Individual charging bays are positioned onto the vehicle sidewall, mounting to sidewall extrusions. Individual charging bays allow for expandable installations.

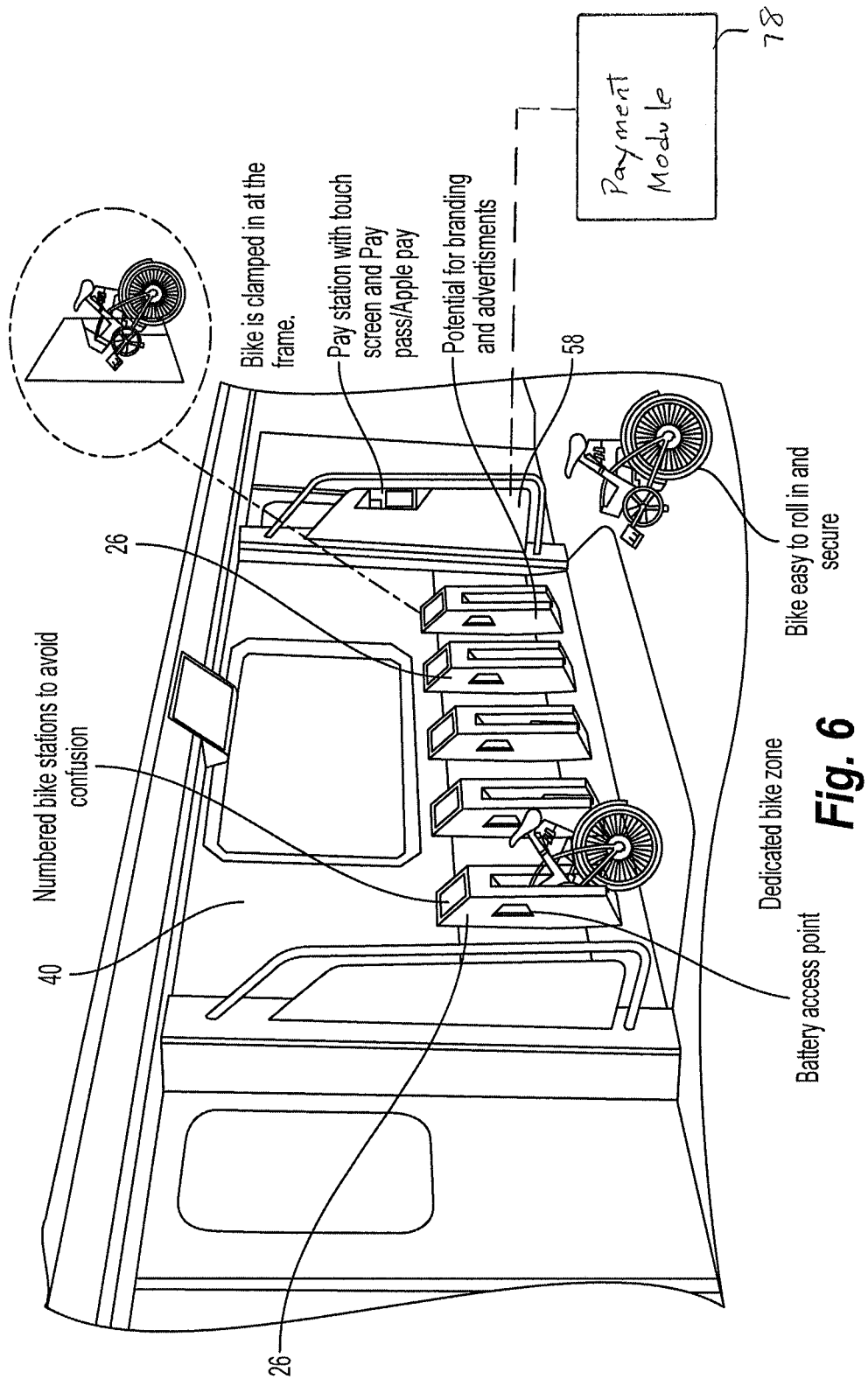

1. Position folded e-Bike with an empty charging bay

3. Continue pivoting the e-Bike into the charging bay engaging the electronic latch 2. Pivot e-bike forward into the charging bay 4. As the e-Bike is rotated into position charging pins will engage and the electronic latch will lock the bike in position. Charging of the bike's battery automatically commence.

Charging pins are located on the flange of the folded e-Bike. These electric connections engage when the bike is mounted into the charging bay. The flange is also utilized to mount the bike and lock it in position.

Simple bike tyre hook which pairs with a smart phone for quick secure and release.

TELLS YOU BATTERY CHARGE

MOVING RUBBER CLAMP

A PLACE TO SECURE AND LEAVE YOUR HELMET

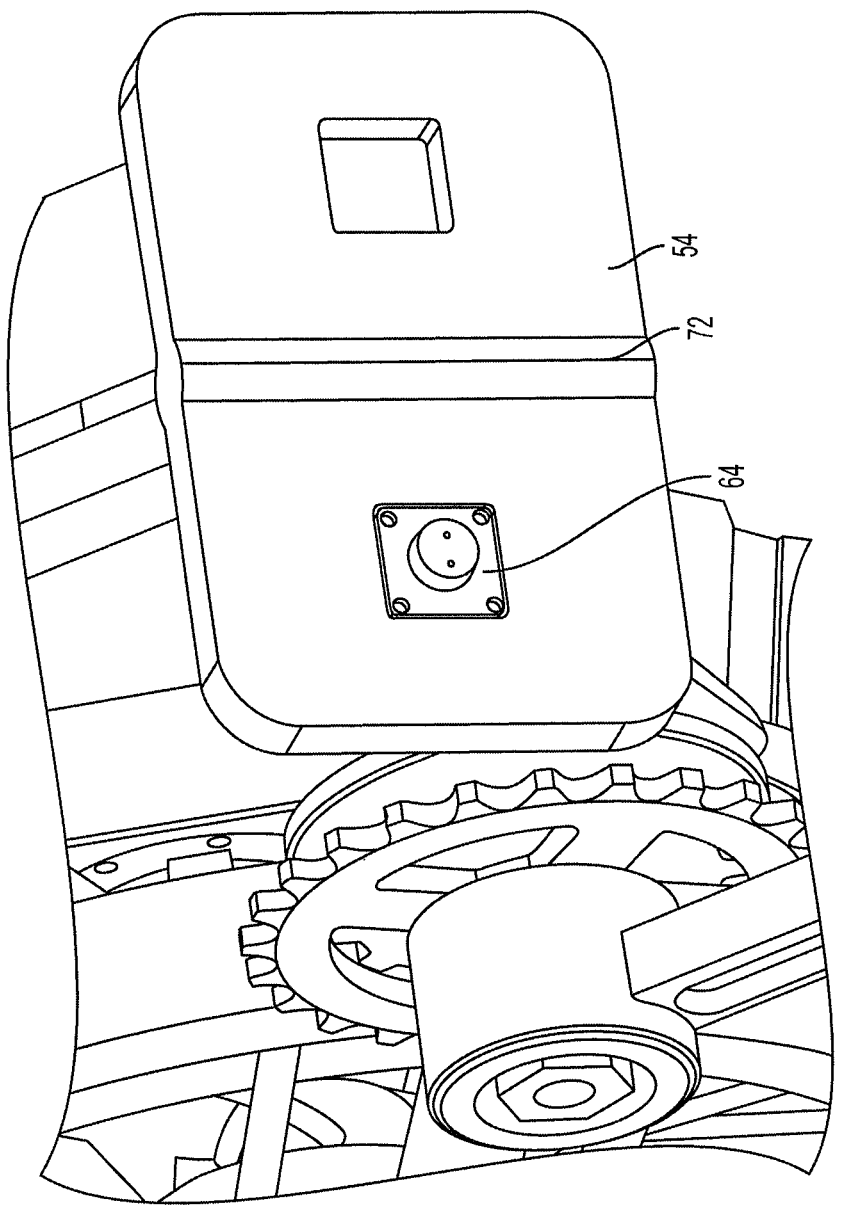
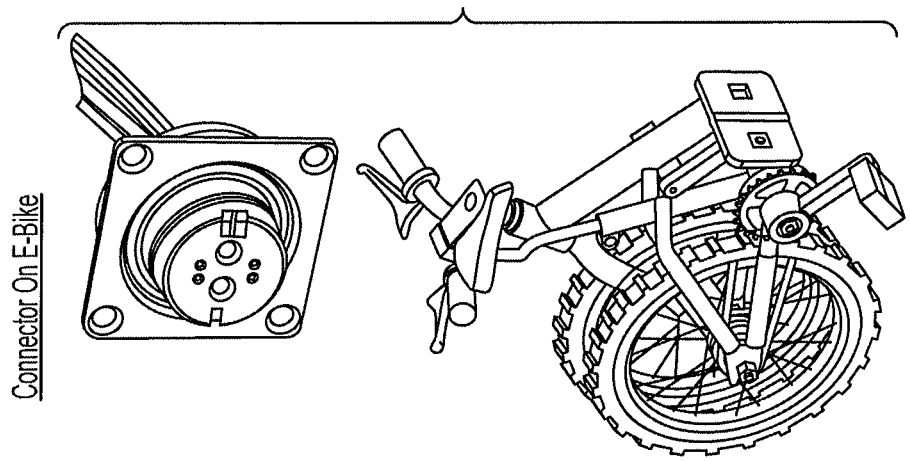
Fig. 18b
Fig. 18a

3. Bicycle Locking Mechanism

LCD Display to show status of E-bike
Top Telescopic tube
Guiding Rubber
Bottom Telescopic tube Bi-cycle inserted position
Bi-cycle inserted position
During connecting with charger

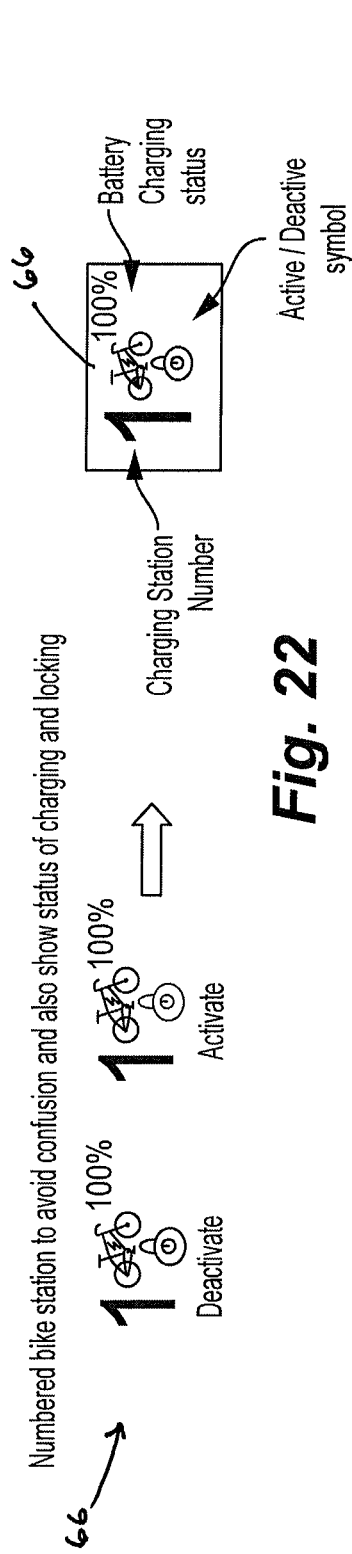
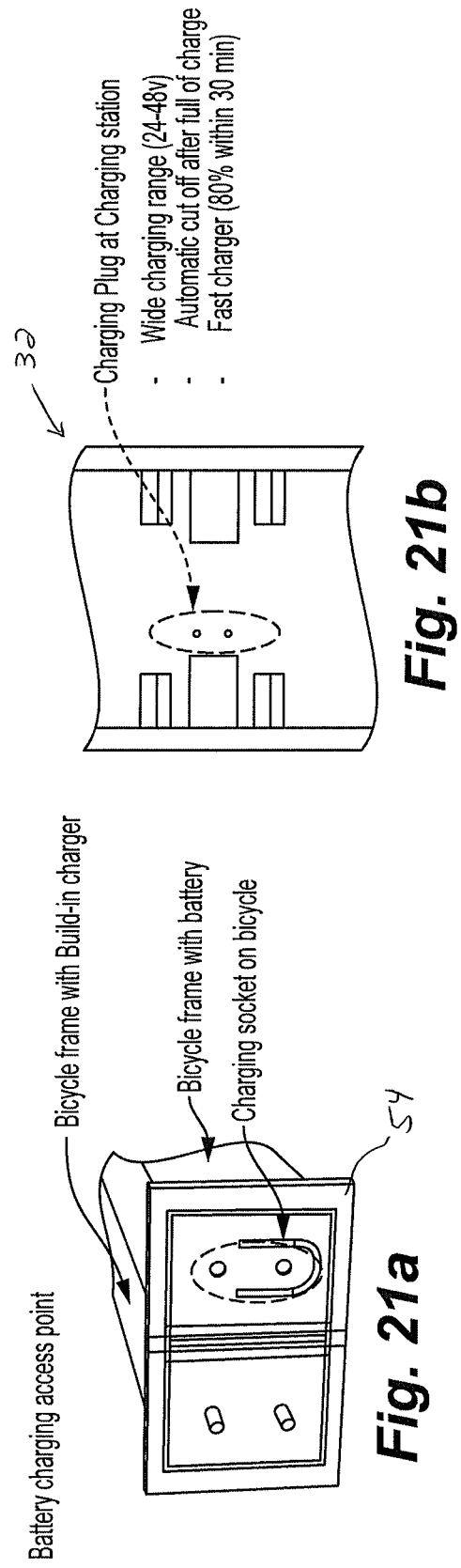

Connector Type : Rosenberger RoPD Power Data Magnetic Connector

RoPD® Connectors - Exploring Generation LEV

Rosenberger Power Data Connectors are a revolutionary magnetic connector system - developed for the Light Electric Vehicles Industry (LEV). They are especially suited for data communication and power transmission of voltages up to 60 V DC and current loads up to 40 A.

RoPD Connectors utilize magnetic locking with a perfect self-mating capability instead of a mechanical plug-in mount. Forced disconnection will not damage the connector or the LEV.

Product Features
- Magnetic locking mechanism
- 4 pins for data communication and 2 pins for power transmission
- 100% self-location
- Shallow mounting depth
- Waterproof and robust
- Shock - and vibration proof
- Reliable contact pressure
- Zero-force mating
- High number of mating cycles

Applications

RoPD® Connectors are suitable for the Light Electric Vehicles Industry (LEV) for data communication and power transmission, e.g. pedelecs, e-bikes, e-scooters and wheelchairs.

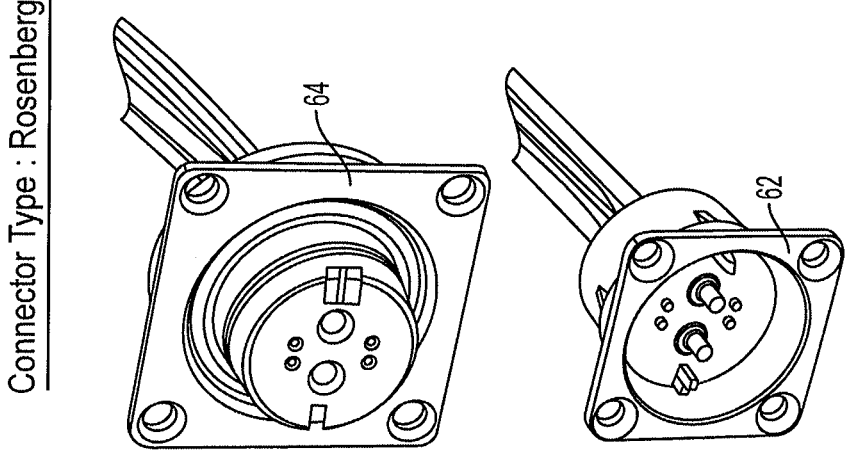

Fig. 23

Connector Type: Rosenberger RoPD Power Data Connector

RoPD® Cable Assemblies & Accessories

| Rosenberger No. | Max. Current Load | Assembly incl. Connector | |
|---|---|---|---|
| C001-04-xxx-y* | 10A | Charging connector jack straight | |
| C003-03-xxx-y* | 30A | | |
| C001-08-xxx-y* | 10A | Charging connector jack right angle | |
| C003-04-xxx-y* | 30A | | |
| C001-A2-xxx-y* | 10A | Slide-in panel jack straight round flange | |
| C003-A2-xxx-y* | 30A | | |
| C006-A2-xxx-y* | 40A | | |
| C001-10-xxx-y* | 10A | Slide-in panel jack straight 4-hole-flange | |
| C003-BB-xxx-y* | 30A | | |
| C003-B2-xxx-y* | 40A | | |
| C001-21-xxx-y* | 10A | Battery panel plug straight round flange | |
| C003-17-xxx-y* | 30A | | |
| C006-17-xxx-y* | 40A | | |
| C001-11-xxx-y* | 10A | Battery panel plug straight 4-hole-flange | |
| C003-B1-xxx-y* | 30A | | |
| C006-B1-xxx-y* | 40A | | |
| M4Z003-000 | | Protection cap for plug connectors | |

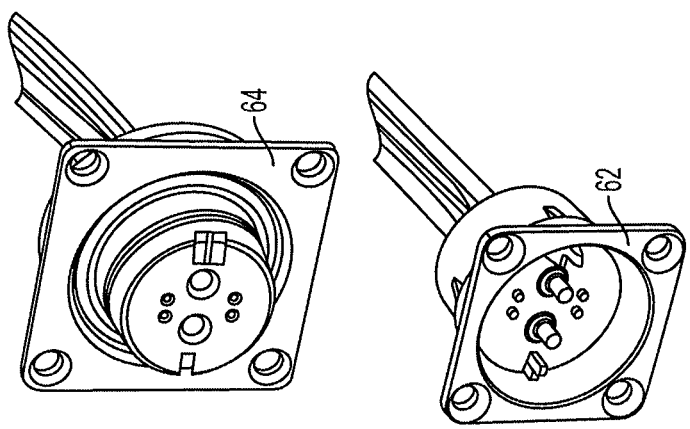

*Fig. 24*

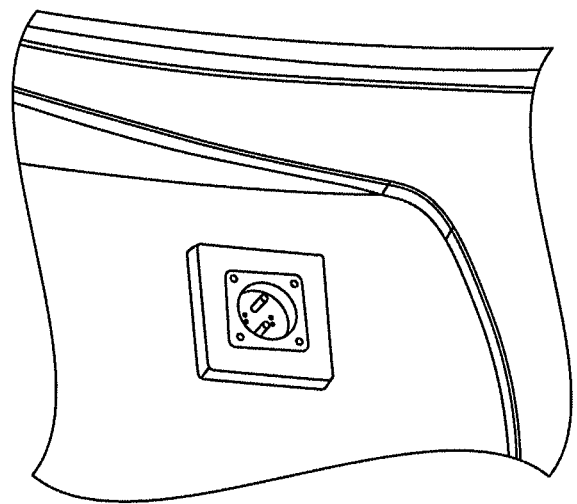
*Fig. 27c*
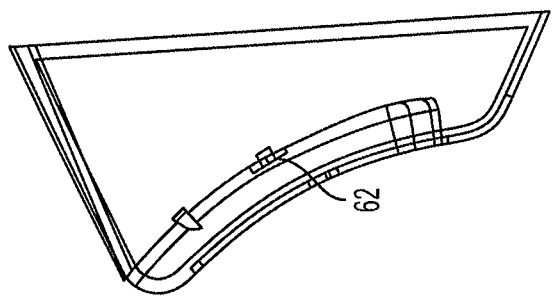
*Fig. 27b*
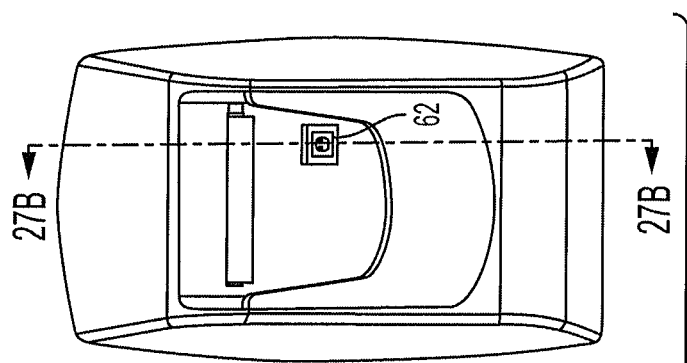
*Fig. 27a*
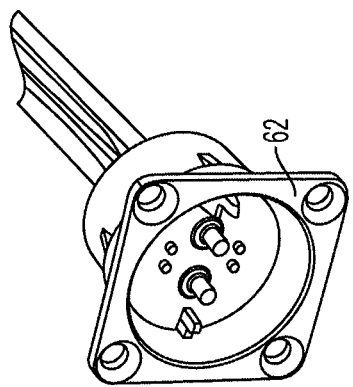
Connector on Charging Station

RAIL VEHICLE HAVING A DEDICATED AREA FOR RECHARGING LIGHT ELECTRIC VEHICLES

CROSS REFERENCE TO RELATED APPLICATION

This application claims the benefit of U.S. Provisional Application No. 62/524,076, filed Jun. 23, 2017, the contents of which is incorporated in its entirety herein by reference.

BACKGROUND OF THE INVENTION

Field of the Invention

The present invention generally relates to the field of rail vehicles. More specifically, the invention relates to a rail vehicle specially equipped so as to safely store and recharge small road vehicles such as an electric bicycle or an electric scooter.

Description of Related Art

Mass transportation has gained in popularity in recent years, mainly as a means to avoid increasingly heavy traffic in congested cities and also as an environmental conscience from passengers willing to contribute to lowering pollution.

However, these well-intended passengers often face an inconvenience once they get off the bus or train: they have not yet reached their final destination and they may still have a significant distance to travel. This is what is called in the railway industry the "Last Mile".

In order to respond to a similar demand, cities have put in place car sharing or bicycle sharing programs. These, however, are not always located near bus stops or near train stations and consequently do not appropriately respond to the "Last Mile" problem.

There is, therefore, a need for a solution that is convenient for rail passengers to travel to their final destination once they get out of the train.

SUMMARY OF THE INVENTION

Generally, the present invention provides a rail vehicle that overcomes or mitigates one or more disadvantages of known rail vehicles, or at least provides a useful alternative.

The invention provides the advantages of providing its passengers an easy access to a light electric vehicle, such as an electric bicycle or an electric scooter, for when they reach their disembarking station and want to travel to their final destination in a convenient manner.

In a preferred and non-limiting embodiment or example, there is provided a rail vehicle adapted to travel on one or more (i.e., two) rails. The rail vehicle comprises a car body supported by wheels adapted to roll along the one or two rails. The car body has a passenger space and a stowage space where passenger space is adapted to accommodate passengers and the stowage space is provided with a station for accommodating light electric vehicles and a separate controller. The station has a chassis, a holding structure, a locking mechanism, and a power outlet. The holding structure is operative to hold the light electric vehicle stationary. The locking mechanism is operative to retain the light electric vehicle in the holding structure. The power outlet is operative to deliver electrical power to a battery of the light electric vehicle when the light electric vehicle is secured in the holding structure and connected to the power outlet. The power outlet is connected to an electrical power network of the rail vehicle. The controller is operative to selectively send a release signal to the locking mechanism, so as to release the locking mechanism, and to selectively operate the power outlet so as to deliver the electrical power.

In one preferred and non-limiting embodiment, a plurality of stations may be aligned along a first sidewall of the car body. A passenger seat portion may be located on a second sidewall opposed to the first sidewall. The plurality of stations may take up a length of space along the first sidewall that corresponds substantially to a length of the passenger seat portion. The stowage space may take up at least a portion of a first side of the car body.

In one preferred and non-limiting embodiment, the holding structure may comprise a recess that is located in a surface of the station. This recess is at least partially covered by a cover. The cover has a notch. The notch has a receiving portion that is adapted to receive a grabbing portion of the light electric vehicle.

In one preferred and non-limiting embodiment, the receiving portion may be located at least 50 cm (19.7 in) above a floor of the car body. The notch should be at least 60 mm (2.4 in) wide, or at least 75 mm (2.9 in) wide, in its receiving portion so as to accommodate a portion of a frame of the light electric vehicle.

In one preferred and non-limiting embodiment, the locking mechanism may comprise a moveable tab. The tab, which is then located in the recess, is operative to prevent the light electric vehicle from escaping or being removed from the receiving portion of the notch absent the release signal. Alternatively, the locking mechanism may comprise at least one telescoping tube operative to lock the light electric vehicle in place.

In one preferred and non-limiting embodiment, the power outlet is preferably located in the recess so that when a portion of the frame (e.g., the grabbing portion) of the light electric vehicle is placed in the holding structure, and locked in place by the locking mechanism, the battery of the light electric vehicle is ready to be recharged.

In one preferred and non-limiting embodiment, all power outlets are identical in all stations. It can be desirable for each station to use a standard charging connector as well as having a standard grabbing portion for the frame of the light electric vehicle.

In one preferred and non-limiting embodiment, the power outlet may include a data communication port for communicating with the light electric vehicle. This allows, among other things, for the controller to recognize which light electric vehicle is placed in the station for, for example, billing operations to a user.

In one preferred and non-limiting embodiment, the station may further be equipped with a power level indicator for showing a power level of the light electric vehicle that is connected to the station. The power level may be detected through the data communication port or through electrical connectors of the power outlet that are connected to the light electric vehicle battery.

In one preferred and non-limiting embodiment, the controller can be responsible for controlling the operation of the station and at least some of its components, such as the locking mechanism and/or the power outlet. The controller may communicate with a local or remote payment module configured to process a payment and can be operative to operate the locking mechanism and the power outlet based on information provided by the payment module and on information from the light electric vehicle gathered through the data communication port. Alternatively, this gathering of information could be gathered from the light electric vehicle by RFID, Bluetooth, or Wifi. The payment module (which can include a processor and memory) may be located in the rail vehicle or in the station itself.

In one preferred and non-limiting embodiment, the light electric vehicle is an electric bicycle (also known as an electrically assisted bicycle). In this example, each station can be a bicycle stations adapted to receive such bicycles. Alternatively, or additionally, the light electric vehicle may be an electric scooter and the stations are then electric scooter stations.

BRIEF DESCRIPTION OF DRAWINGS

These and other features of the present invention will become more apparent from the following description in which reference is made to the appended drawings wherein:

FIG. 1b is a cross-sectional side view of the rail vehicle of FIG. 1a;

FIG. 6 is an isometric view of a stowage space of the rail vehicle of FIG. 1 equipped with a plurality of bicycle stations according to the principles of the present invention;

FIG. 18a is an isometric view of the foldable bicycle of FIG. 7 and an example electrical connecter of the foldable bicycle;

FIG. 18b is an isometric view of a detail of the connecting interface of the foldable bicycle of FIG. 18a;

FIG. 19a is an isometric view of the third station and bicycle of FIG. 3;

FIG. 19b is a side view of the third station and bicycle of FIG. 19a;

FIG. 19c is a cross-sectional side view of the connecting interface of the bicycle inserted in the third station of FIG. 19b;

FIG. 21a is a partial isometric view of a detail of the connecting interface of the bicycle of FIG. 15;

FIG. 21b is a front view of a detail of the holding structure of the station of FIG. 20a;

FIG. 22 is a schematic view of a status indicator of the station of FIG. 20a;

FIGS. 23 and 24 are isometric views of the two portions of an electrical connector used in the bicycle and station of FIG. 19c and tables including data and information about the electrical connector;

FIG. 27a is an isolated front view of one of the third stations and electrical connector of FIG. 4;

FIG. 27b is a cross-sectional side view of the third station of FIG. 27a;

FIG. 27c is an isometric view of a detail of the holding structure and electrical connector of the station of FIG. 27a;

DETAILED DESCRIPTION OF THE INVENTION

Figure 1A:
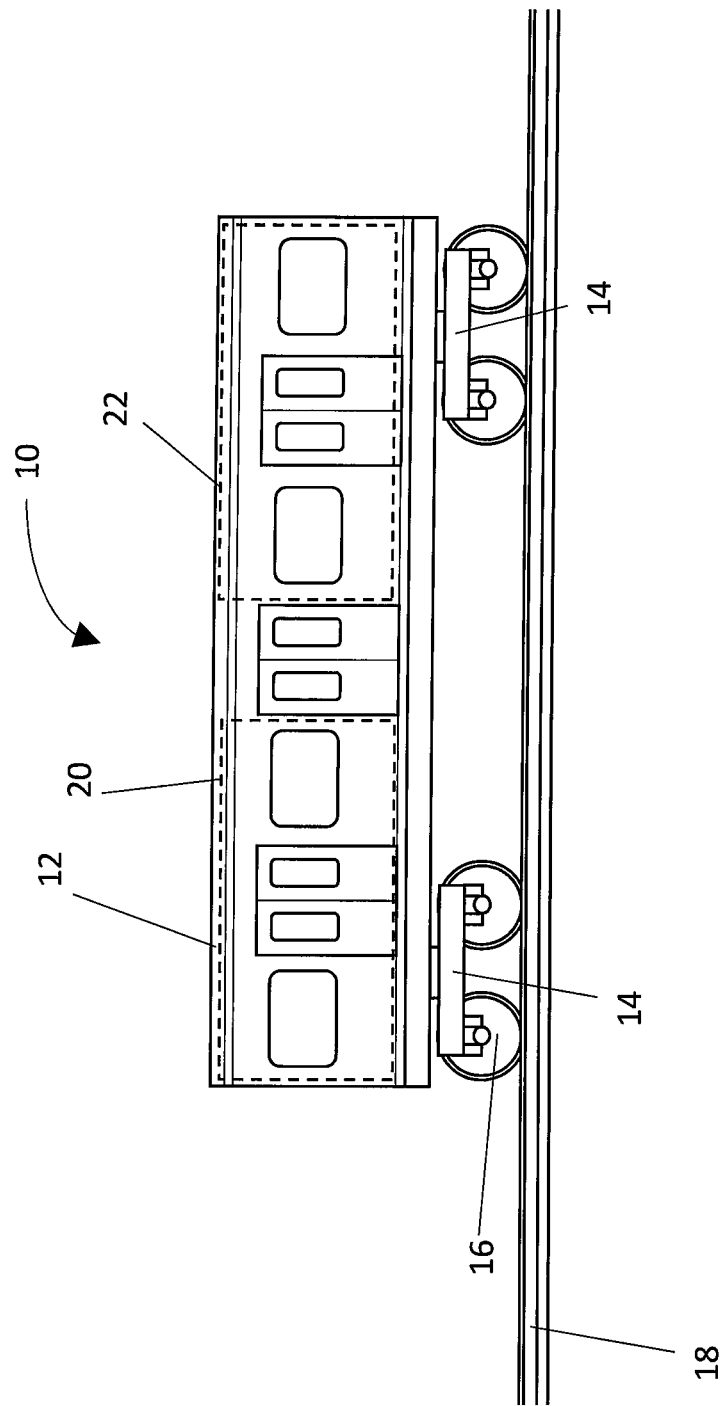
FIG. 1a is a side view of a rail vehicle according to the principles of the present invention.

Various non-limiting examples will now be described with reference to the accompanying figures where like reference numbers correspond to like or functionally equivalent elements.

Disclosed is a rail vehicle including a car body equipped both with a passenger zone and stowage zone where the stowage zone is provided with at least one station, or support, capable of holding and recharging a light road-going electric vehicle such as an electric bicycle, an electric scooter, and the like. A controller manages the availability of the electric vehicle as well as the recharging of the electric vehicle.

Referring to FIGS. 1a, 1b, 2, and 3, a rail vehicle 10, which by definition is adapted to travel on one (such as a monorail) or two (or more) rails, comprises a car body 12 supported by bogies 14 having wheels 16 adapted to roll along the one (in the case of a monorail) or two (or more) rails 18. The car body 12 has a passenger area 20 and a stowage area 22.

In one preferred and non-limiting embodiment, the passenger area 20 can be adapted or configured to accommodate passengers, for example by having seats 24, while the stowage area 22 can be configured with at least one station 26, which may be a support, for accommodating at least one light electric vehicle, such as an electric bicycle or an electric scooter. For convenience, the present description will use a foldable electric bicycle 28 as an example of the light electric vehicle, such as the foldable electric bicycle examples 28 shown in FIGS. 3, 15, 16, and 18a. Example electrical parameters of an example foldable electric bicycle 28 and station 26 are shown in the following Table 1,

TABLE 1

| Battery Voltage | 24 V DC |
|---|---|
| Battery current | 8 Amp |
| Power consumption | Approx. 200 Watts |
| Number of charging stations | 5 per each car |
| Total power consumption per car | 1000 Watts |
| Additional KW required in Aux power supply | 1 kW per car |

However, Table 1 is not to be construed in a limiting sense.

Figure 1B:
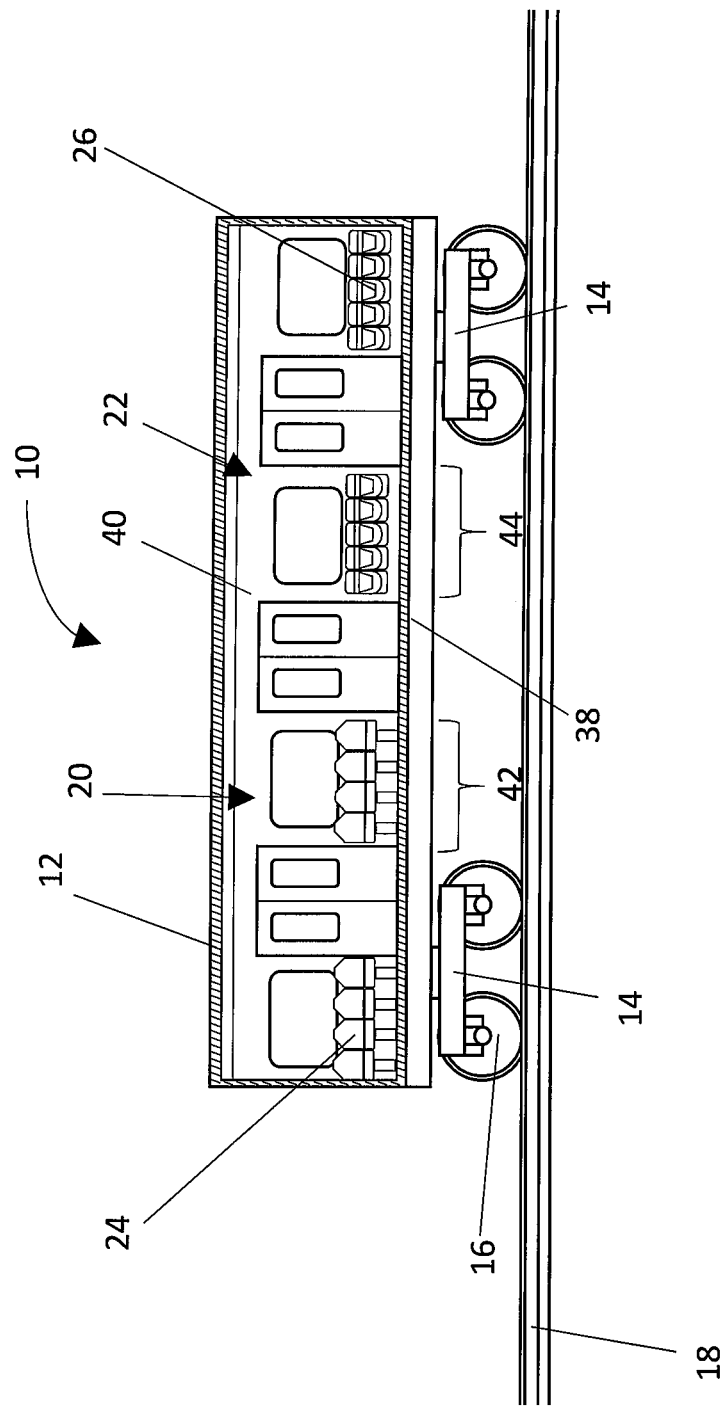
Figure 14:
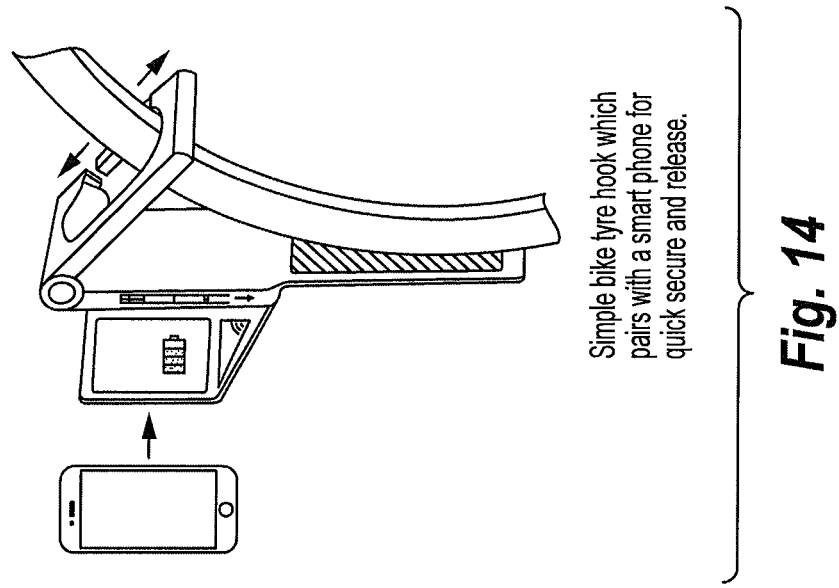
FIG. 14 is an isometric view of a light electric vehicle station according to the principles of the present invention.
Figure 13:
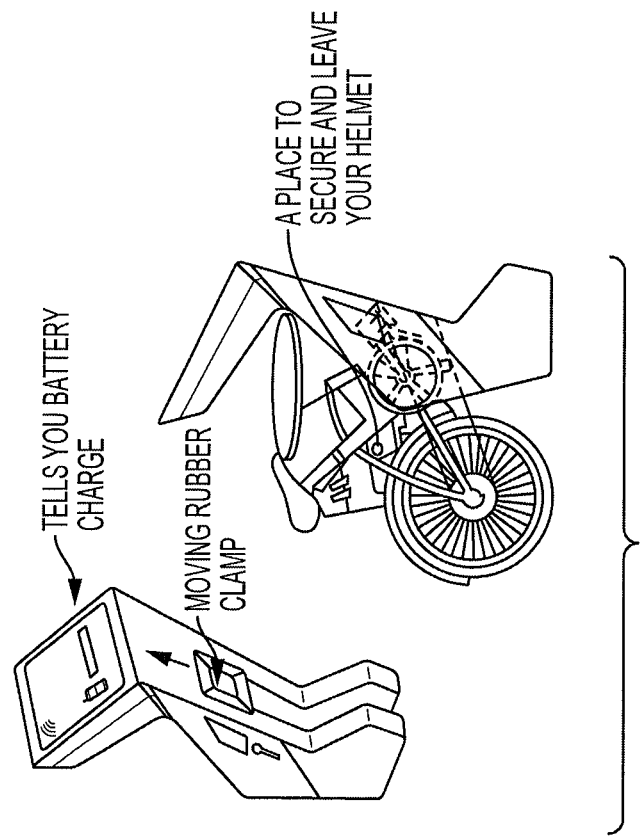
FIG. 13 is an isometric view of a station and a controller user interface according to the principles of the present invention.
Figure 17:
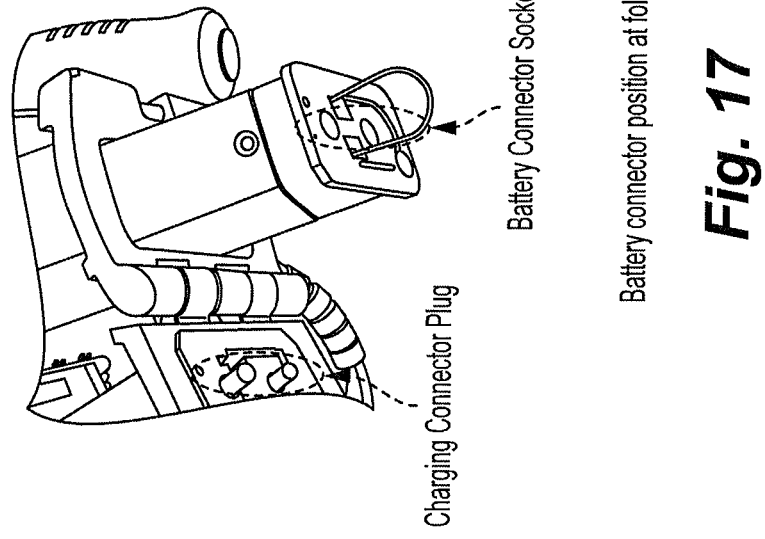
FIG. 17 is an enlarged isometric view of a detail of the connecting interface of the foldable bicycle of FIG. 15.
Figure 15:
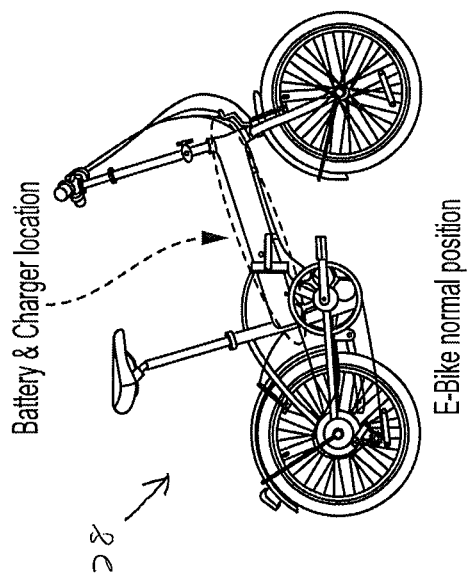
FIG. 15 is a side view of a deployed foldable bicycle according to the principles of the present invention.
Figure 16:
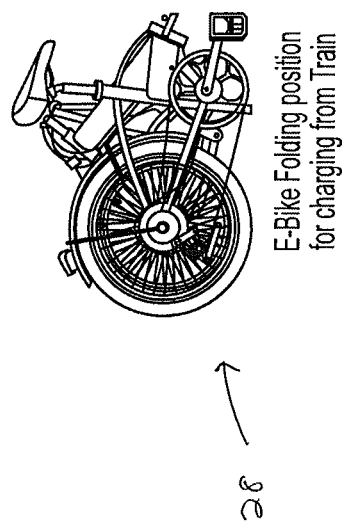
FIG. 16 is a side view of the foldable bicycle of FIG. 15 in its folded position.

As best shown in FIGS. 1b, 3, 4, 5, and 6, now concurrently referred to, in a preferred and non-limiting embodiment or example, a plurality (that is, at least two) of stations 26 may be aligned along a sidewall 40 of the car body 12. A passenger seat portion 42 may be located on a second sidewall 40 opposed to the first sidewall 40, or may be located at a different end of the car body 12, as depicted in FIG. 1b. The plurality of stations 26, making up a stowage portion 44, may take up at least a portion of a first side of the car body 12, or, conveniently, a length of space along the sidewall 40 that corresponds substantially to a length of the passenger seat portion 42. Such a stowage portion 44 can be developed as a module, allows flexibility of tuning the interior of the rail vehicle 10 with a choice of the quantity of stations 26. For example, in a metro-type of rail vehicle, it may be possible to replace a bench, or series of seats, located between two consecutive doors on a given side of the car body 12, with a stowage portion 44 comprising a module of one or more bike stations 26. Also, a train operator could conveniently decide at a later time to retrofit an existing rail vehicle 10 by swapping one passenger seat portion 42 for one stowage portion 44. Various views of a single station 26 (and electrical connector 62) are shown in FIGS. 27a-27c. Views of other embodiment stations including a detected user interface and an interface for a smart phone are shown in FIGS. 13 and 14.

Figure 2:
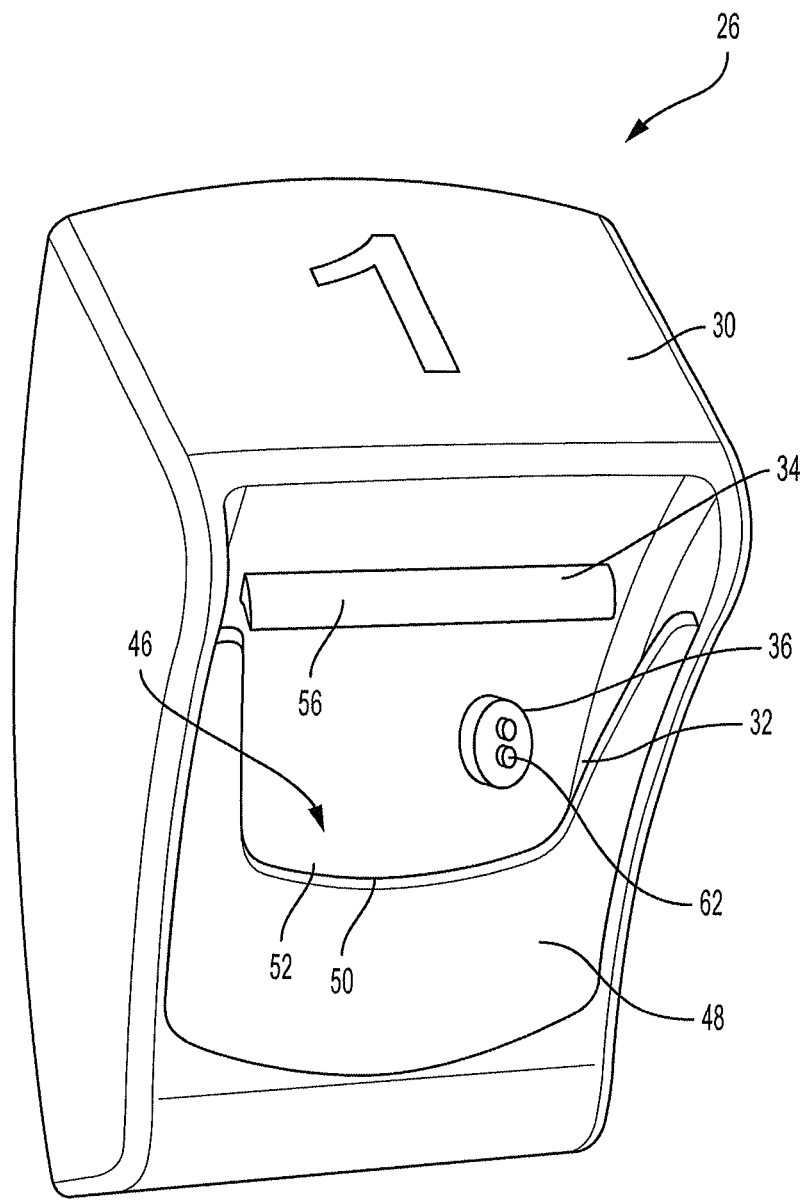
FIG. 2 is an isometric view of a light electric vehicle station according to the principles of the present invention.
Figure 3:
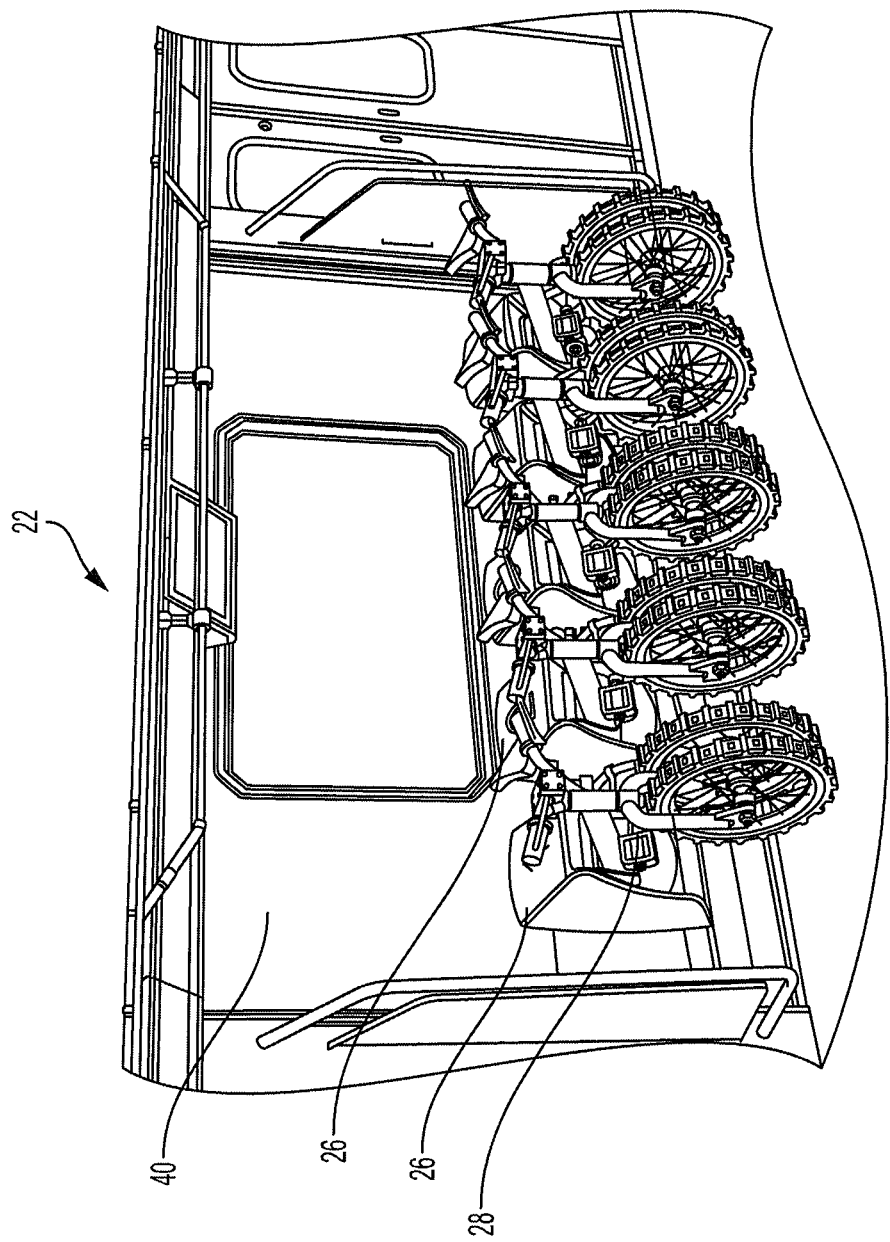
FIG. 3 is an isometric view of a stowage space of the rail vehicle of FIG. 1b equipped with a plurality of stations of FIG. 2 according to the principles of the present invention.
Figure 5:
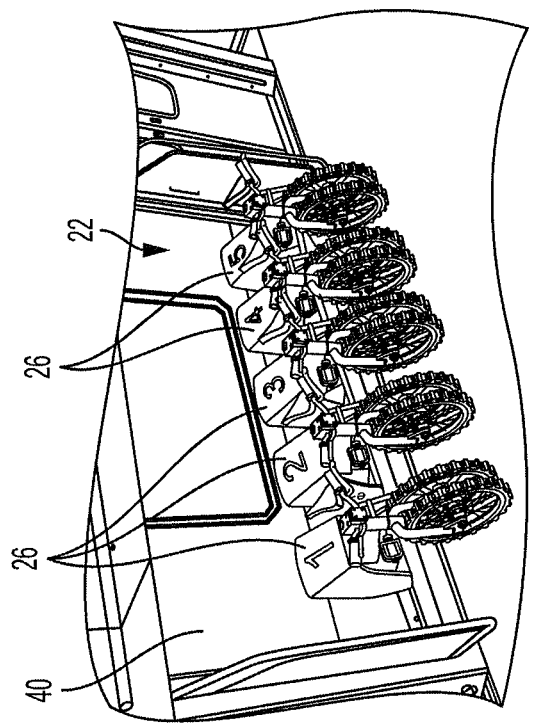
FIG. 5 is an isometric view of the plurality of stations of FIG. 4 loaded with electric bikes according to the principles of the present invention.
Figure 4:
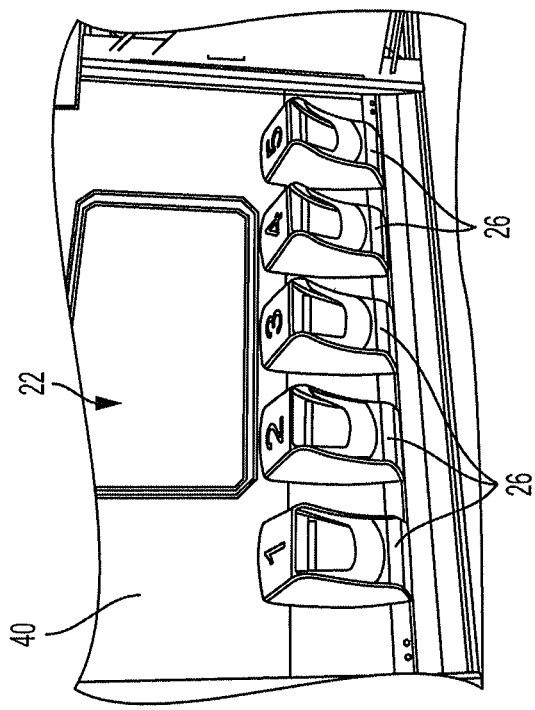
FIG. 4 is an isometric view of the plurality of stations of FIG. 3.

As shown in FIG. 2, in one preferred and non-limiting embodiment, each station 26 can have a chassis 30, a holding structure 32, a locking mechanism 34, and a power outlet 36. The chassis 30 can be sufficiently rigid to support the weight of the bicycle 28. The chassis 30 can be connected to either a floor 38 or the sidewall 40 of the rail vehicle 10 (e.g., as shown in FIG. 1b). In an example, the stations 26 can be mounted to the sidewall 40. The holding structure 32 can be operative to secure the bicycle 28 (or light electric vehicle) in spite of vibrations, accelerations, and other movements typical of rail transports. The holding structure's grip on the bicycle 28 is desirably sufficiently firm or solid so that the bicycle 28 is held in place in case of emergency braking or, possibly, in case of an impact.

Figure 12:
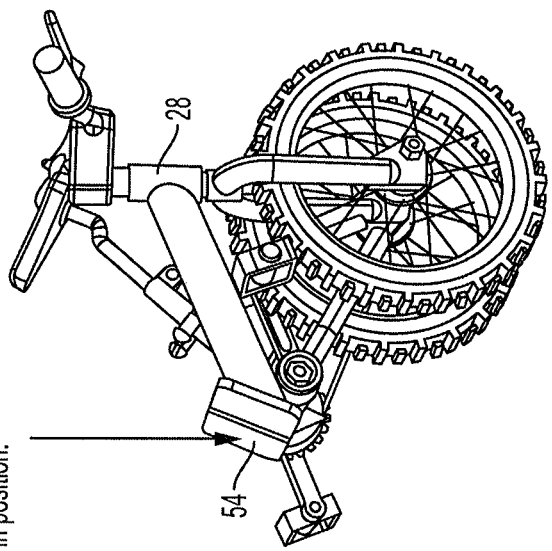
FIG. 12 is an isolated isometric view of the foldable bicycle of FIG. 7.

In one preferred and non-limiting embodiment, the holding structure 32 can comprise a recess 46, similar to a pocket but without necessarily being closed at its bottom. The recess 46 can be located in a surface of the chassis 30. This recess 46 can be at least partially covered or defined by a cover 48. Cover 48 can have a notch 50 or can define a notch with a surface of chassis 30. The notch 50 can have a receiving portion 52 that can be adapted to receive a grabbing portion 54 (FIG. 12) of the bicycle 28 or light electric vehicle. The grabbing portion 54 is best shown in FIG. 12, now concurrently referred to.

In one preferred and non-limiting embodiment, the receiving portion 52 may be located at least 50 cm (19.7 in) above the floor 38 of the car body 12. In an example, the notch 50 can be at least 60 mm (2.4 in) wide, or can be at least 75 mm (2.9 in) wide, in its receiving portion 52 to accommodate a portion of a frame (grabbing portion) 54 of the bicycle 28. In an example, the notch 50 can be wider than a tire or a wheel of the bicycle 28.

In a preferred and non-limiting embodiment or example the locking mechanism 34 can be configured and operative to retain the bicycle 28 in the holding structure 32. The locking mechanism 34 may use any convenient locking mechanism, such as, in an example, a moveable tab 56 (FIG. 2). The moveable tab 56, can be located in or proximate to the recess 46, and can prevent the bicycle 28, in particular, the grabbing portion 54, from being removed from the station 26 and, more particularly, from the receiving portion 52 of the notch 50 absent a release signal sent by a controller 58 (best shown in FIG. 6). The use of other types of locking mechanisms envisioned, such as a mechanism using one or more telescoping or extendable tubes 60 as shown in FIGS. 20a-20d.

Figure 26:
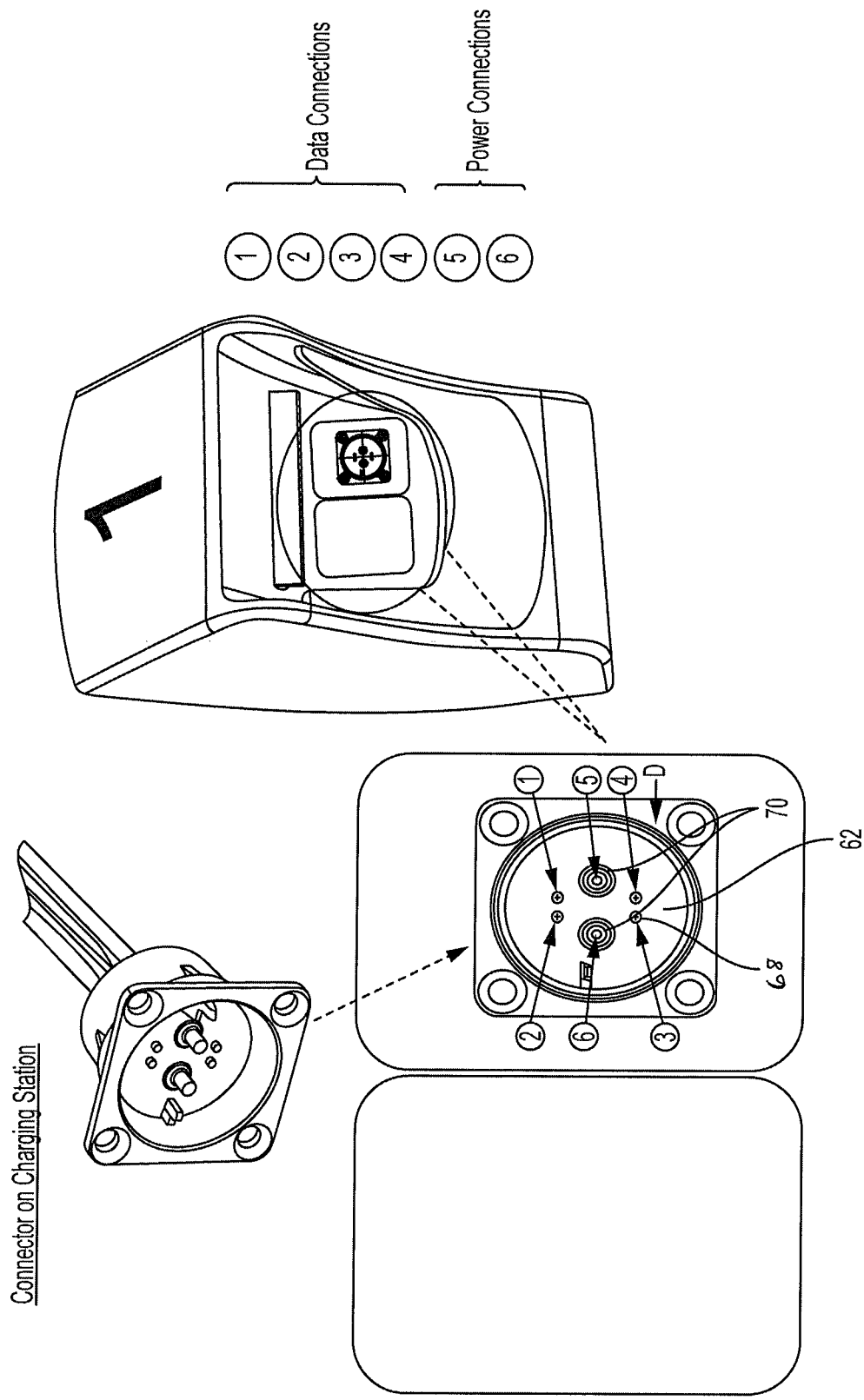
FIG. 26 is an isometric view of the station of FIG. 7 and the data and power connector of said station.
Figure 28A:
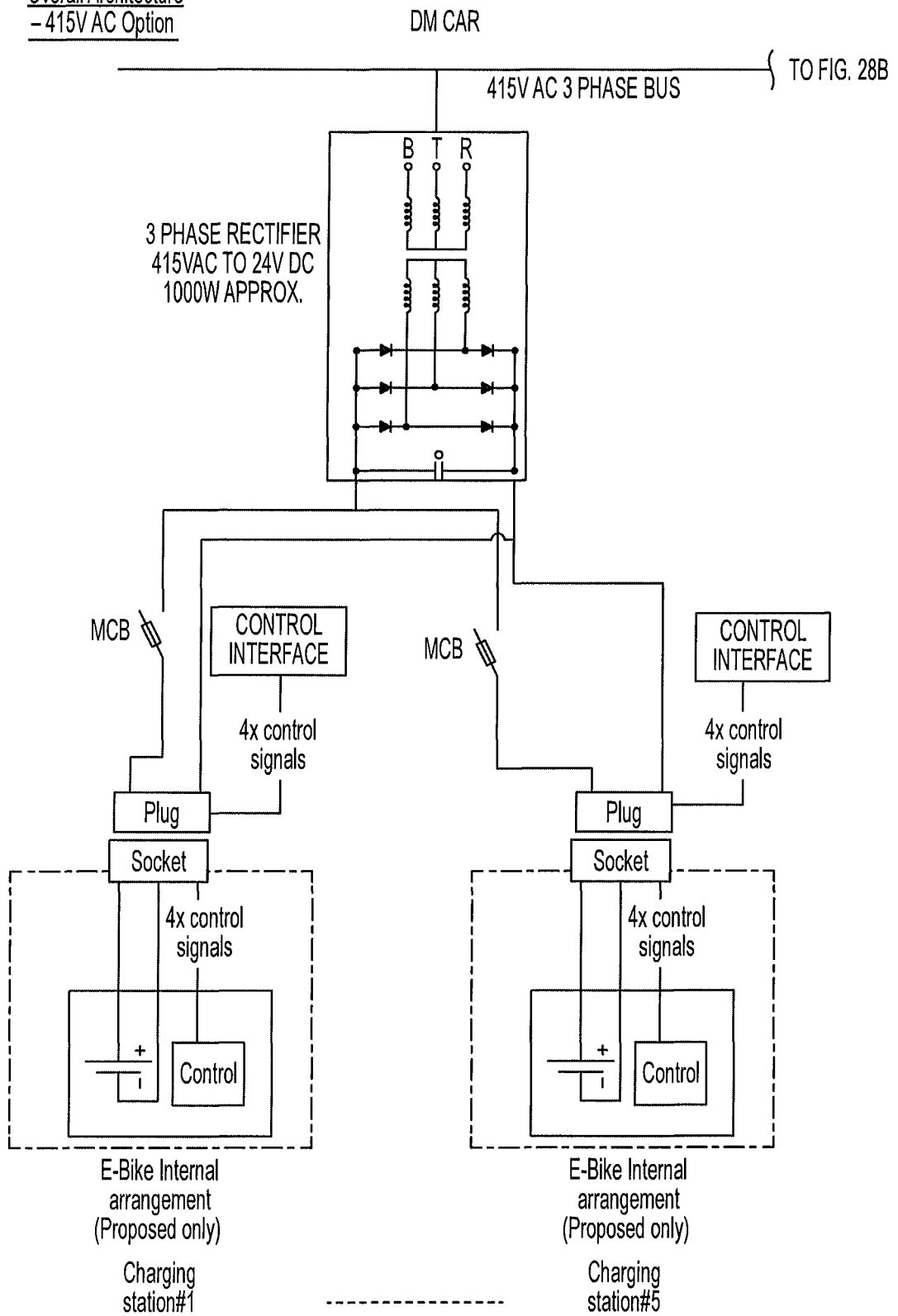
FIGS. 28a-28c are a schematic view of an example electrical architecture of the station of FIG. 2 according to the principles of the present invention.
Figure 28B:
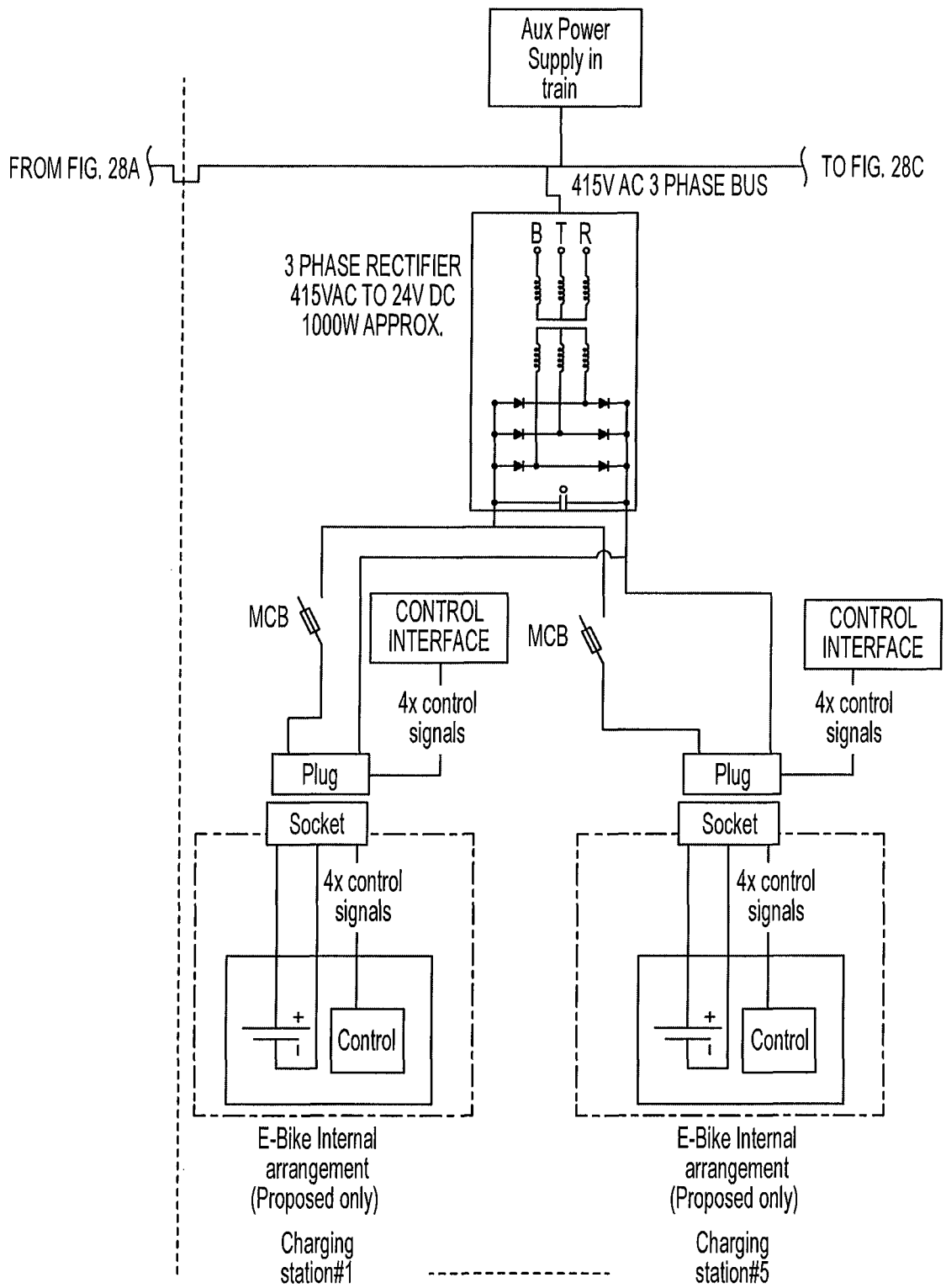
Figure 28C:
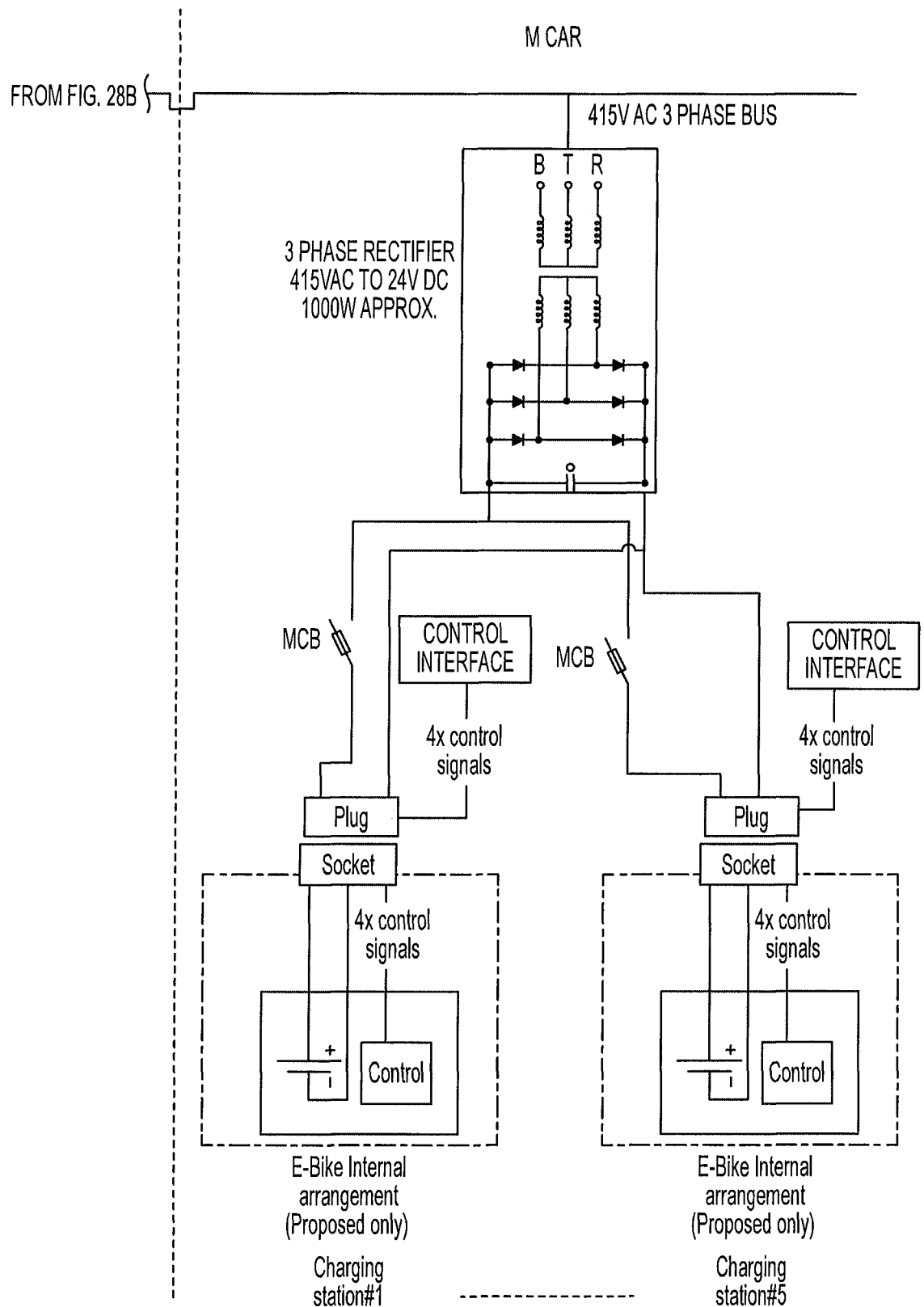
Figure 29A:
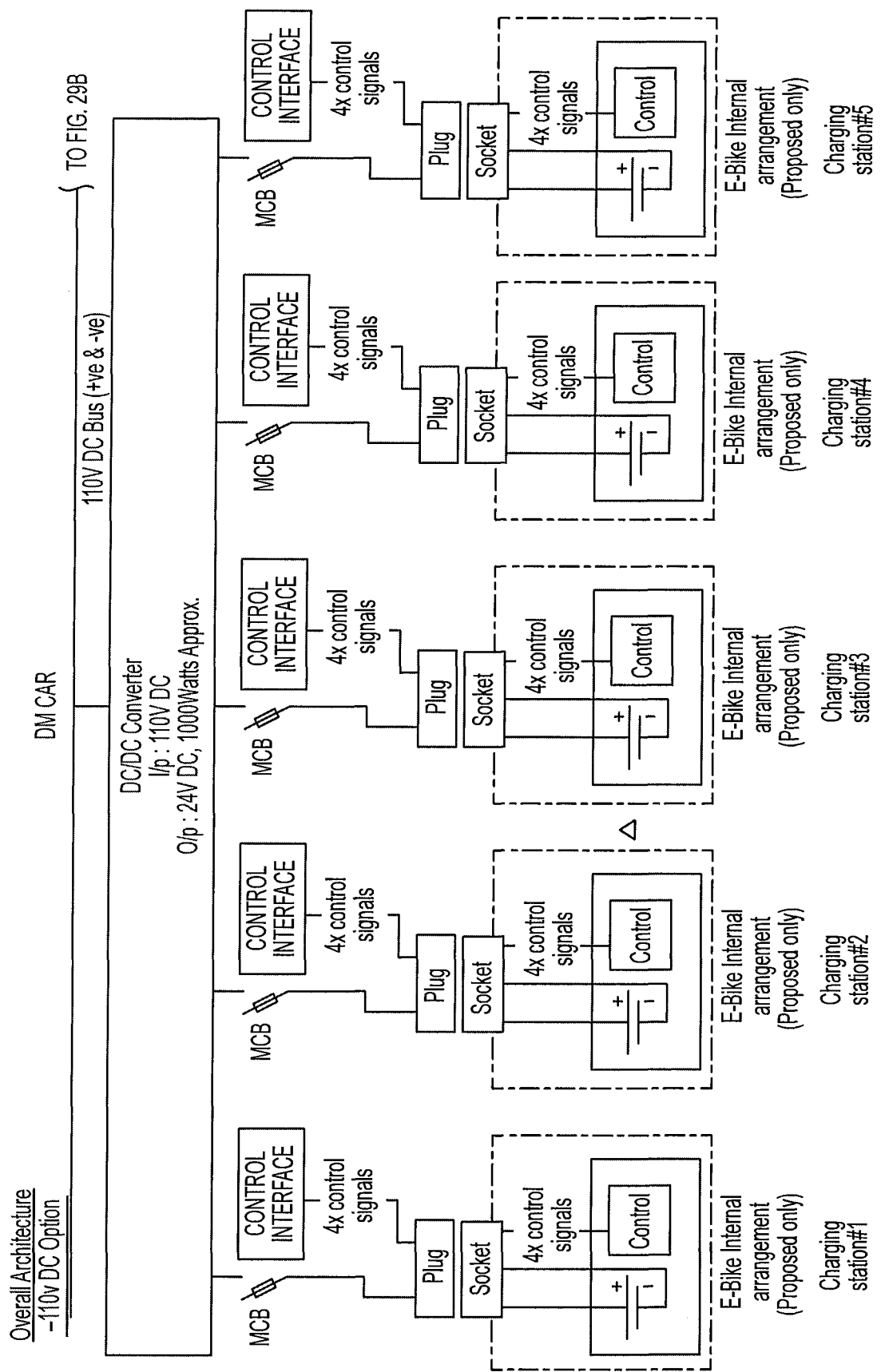
FIGS. 29a-29b are a schematic view of an example electrical architecture of the station of FIG. 2 according to the principles of the present invention.
Figure 29B:
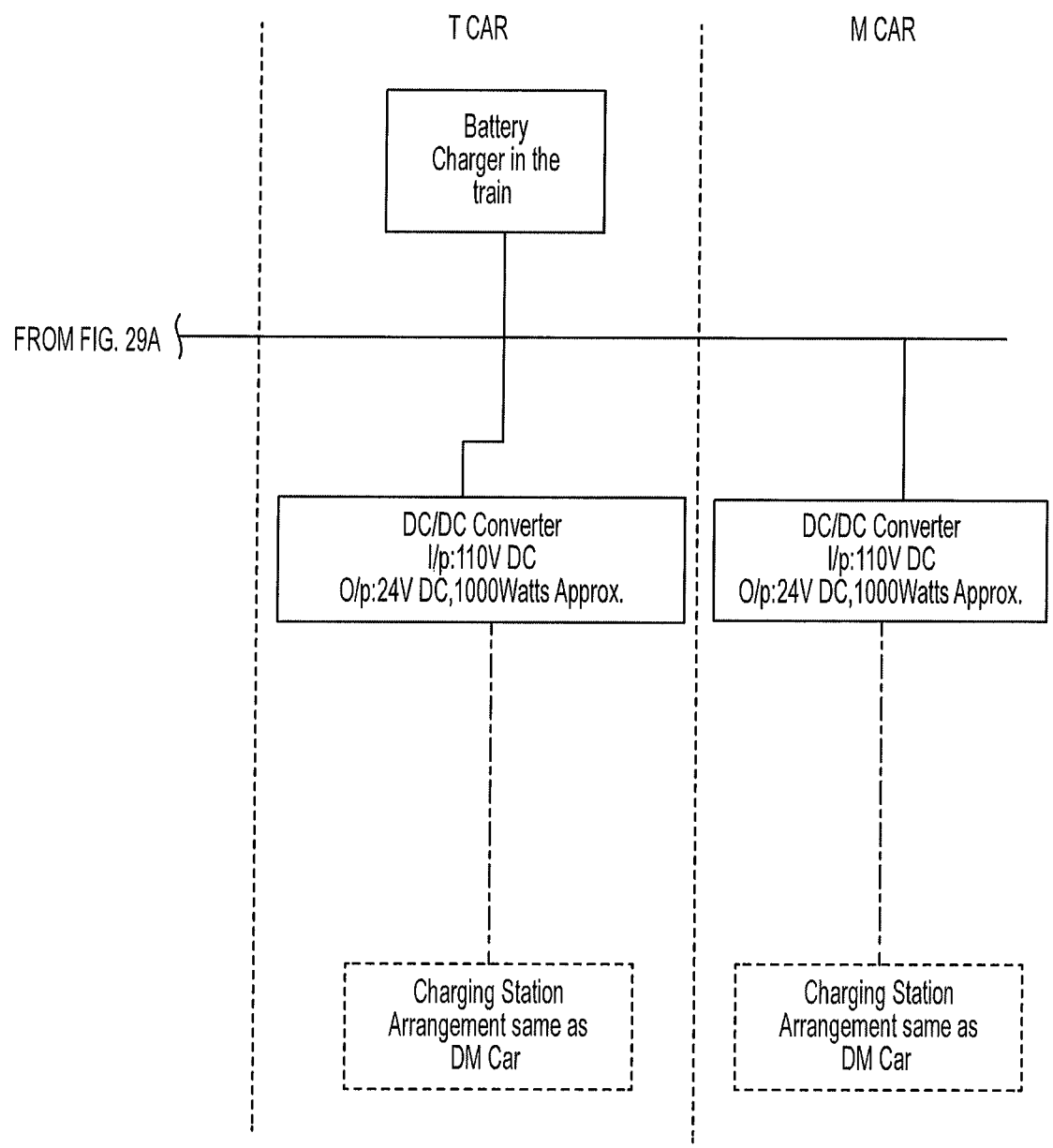
Figure 30A:
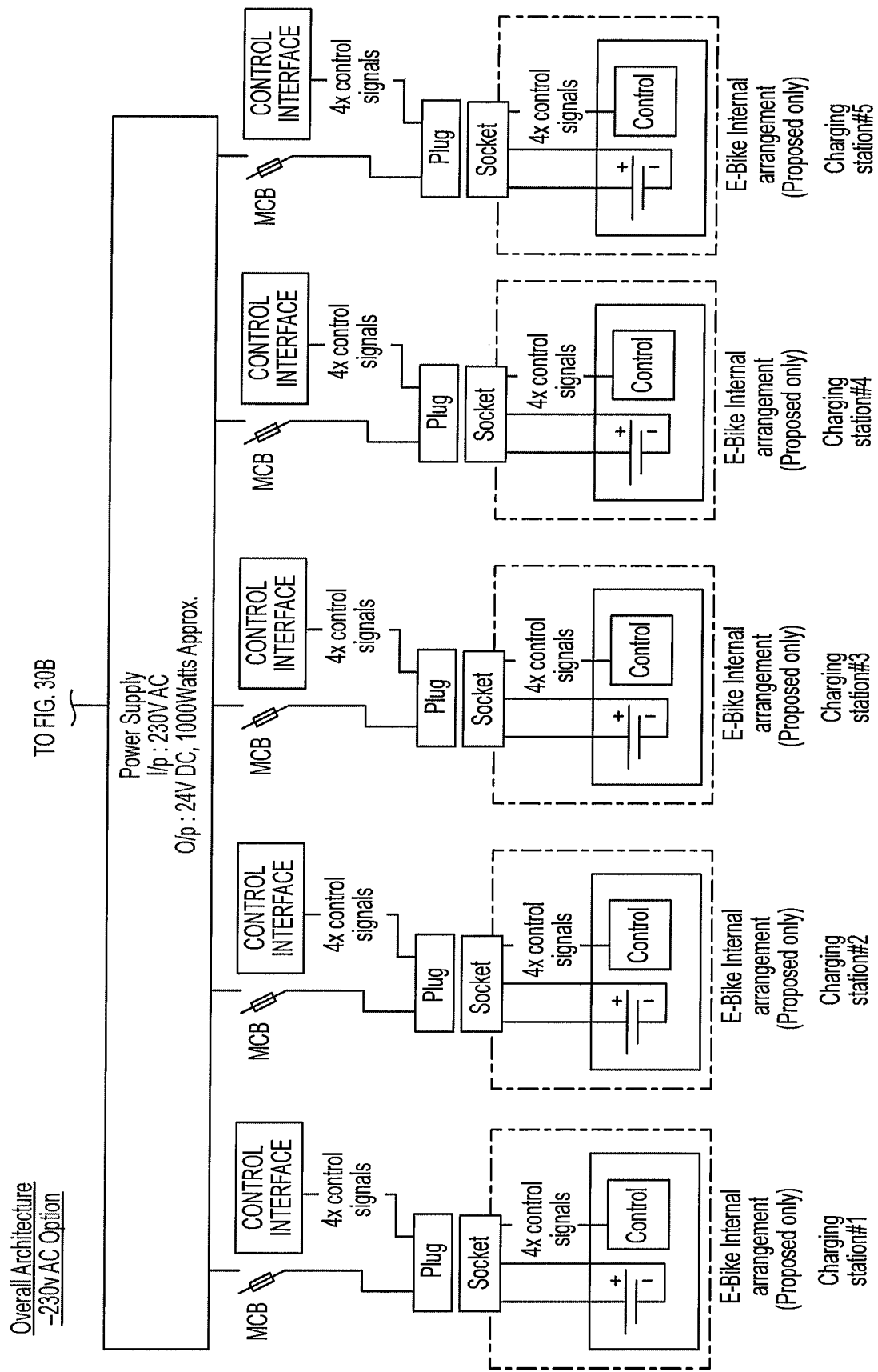
FIGS. 30a-30b are a schematic view of an example electrical architecture of the station of FIG. 2 according to the principles of the present invention.
Figure 30B:
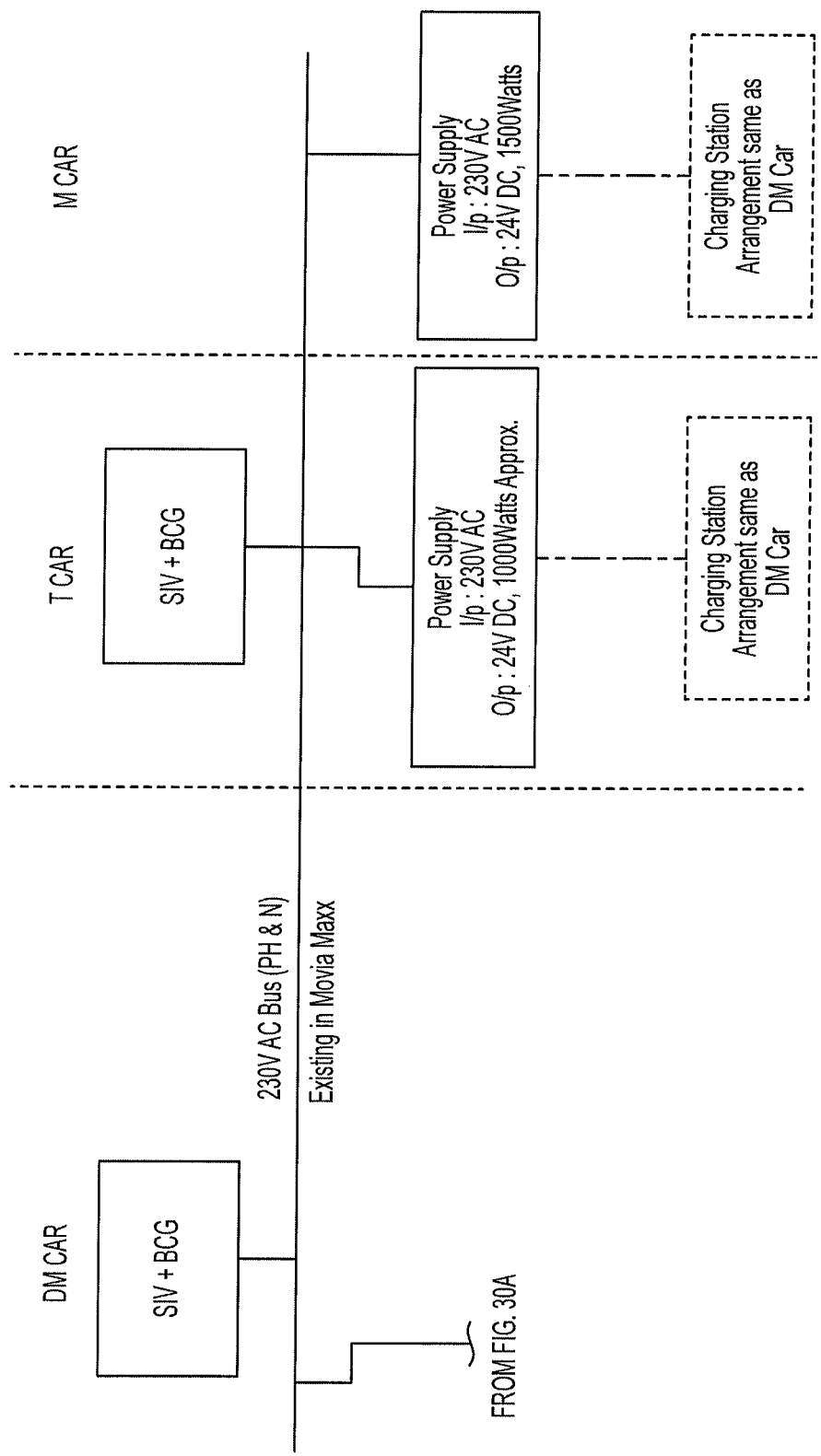

In one preferred and non-limiting embodiment, station 26 can include a power outlet 36, equipped with electrical connectors 70 (FIG. 26), which can be operative to deliver electrical power to a battery of the electric bicycle 28 when the bicycle is secured in the holding structure 32 and connected to the power outlet 36. Considering the power-supply needed, one or more high-energy storage capacitors may be used to deliver the electric charge requested by the connected bicycle(s) 28. The capacitor(s) may be charged using piezo technology, which generates electricity from the movement of the car body 12 or of the bogies 14, or by using the electric power from the grid via the same electrical circuit as is used by auxiliary train equipment. The power outlet 36 may, therefore, be connected to an electrical power network of the rail vehicle 10. In one preferred and non-limiting embodiment, different examples of stations 26 connected to a power network of the rail vehicle 10 are shown in FIGS. 28a-28c (Example 1), FIGS. 29a-29b (Example 2), and FIGS. 30a-30b (Example 3).

In one preferred and non-limiting embodiment, the power outlet 36 can be located in or proximate to the recess 46 so that when the grabbing portion 54 of the frame of the bicycle 28 is placed or inserted in the holding structure 32, and locked in place by the locking mechanism 34, a connector 62 of the power outlet 36 is aligned and automatically connected to a matching connector 64 (FIG. 18b) located on or proximate to the grabbing portion 54. Hence, the battery of the bicycle 28 may be readily recharged upon receiving an appropriate charging signal from the controller 58.

In one preferred and non-limiting embodiment, all stations 26 can be provided with a power outlet 36. Advantageously, all power outlets 36 can be identical in all stations 26 so that standard connectors 62 and standard matching connectors 64 may be used. In the present context, the term "standard" should be interpreted to mean that all connectors 62 are of the same design. Hence, for example, the connectors 62 may either be of a proprietary design or of an "off the shelf" design (i.e., the connectors 62 may be purchased from a supplier's catalog), as long as they are all the same in a given rail vehicle 10. Non-limiting examples of such connectors are shown in FIGS. 23, 24, 25, and 26, now concurrently referred to.

Figures 19A, 19B, 19C:
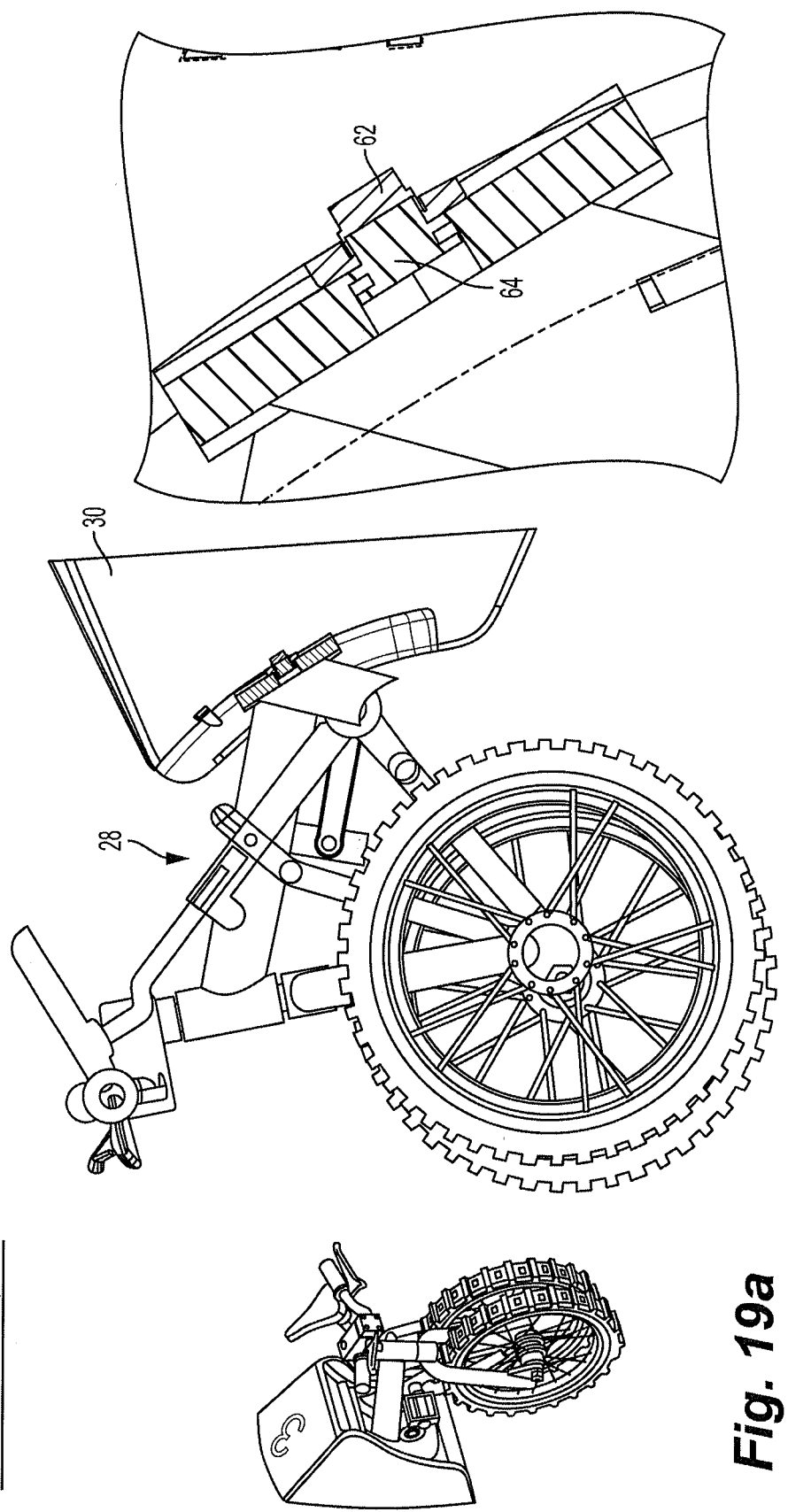

Referring to FIGS. 19a-19c, and with continuing reference to FIGS. 23-26, in one preferred and non-limiting embodiment, the design of the grabbing portion 54 can be standardized for the bicycles 28 so that accurate positioning in the receiving portion 52 of the holding structure 32 ensures that not only the connector 62 and the mating connector 64 adequately mate, but also that the bicycle 28 is adequately maintained in place, and that the locking mechanism 34 can lock the bicycle 28 in place. To enable an adequate connection between the connector 62 and the matching connector 64, one or both of them may be provided with magnets so that both connectors are attracted towards each other.

Figure 25:
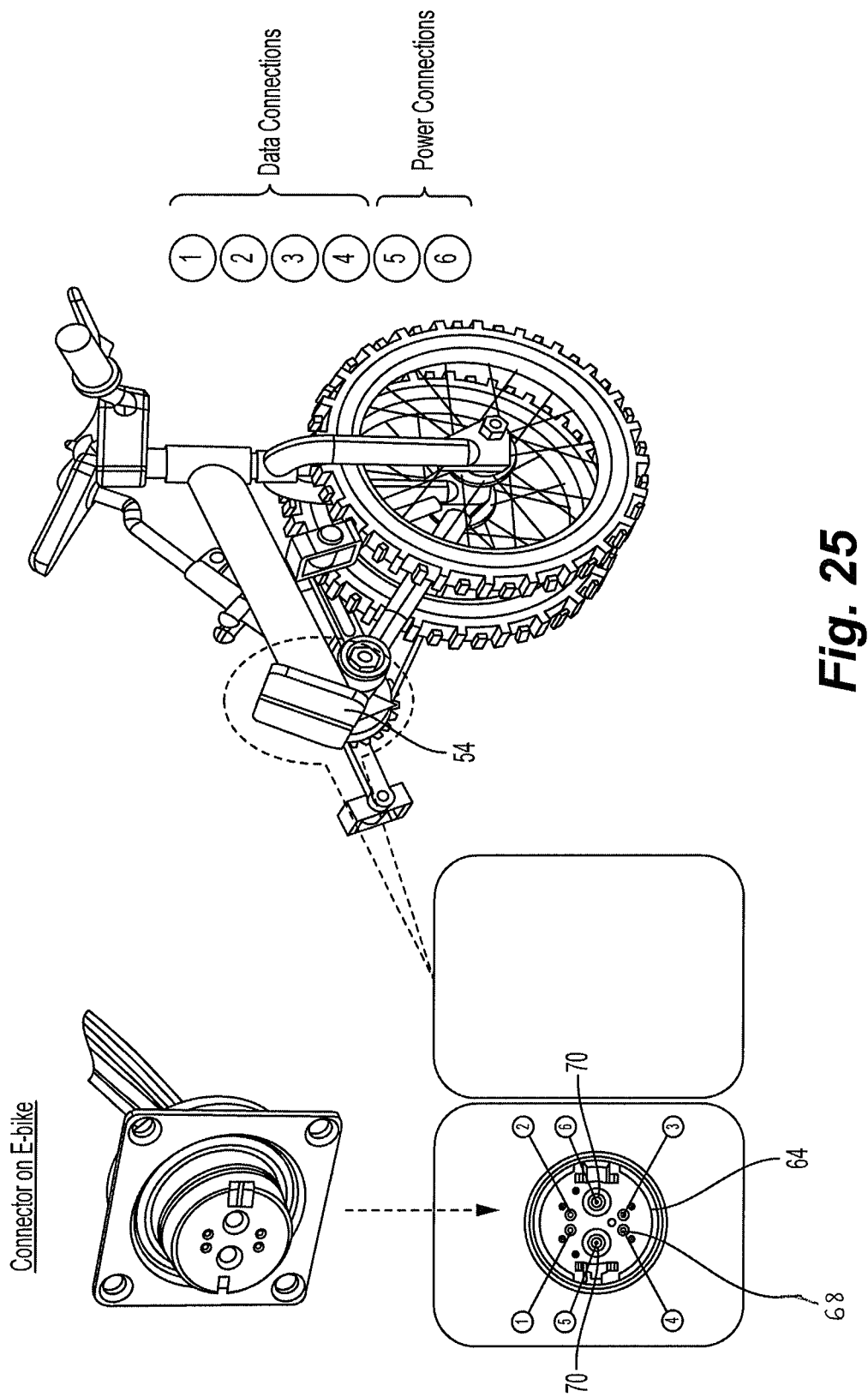
FIG. 25 is an isometric view of the bicycle and the grabbing portion of said bicycle of FIG. 7.

In one preferred and non-limiting embodiment, other example charging access point of a grabbing portion 54 of a bicycle 28 and a holding structure 32 are shown in FIGS. 21a-21b In a preferred and non-limiting embodiment or example the power outlet 36 may further be equipped with a data communication port 68, best shown in FIG. 25, for communicating with the bicycle 28. This allows, among other things, operations of billing to a user by recognizing by controller 58 which bicycle 28 is connected in the station 26. Data gathered through the data communication port 68 can be sent to the controller 58.

Figure 20A:
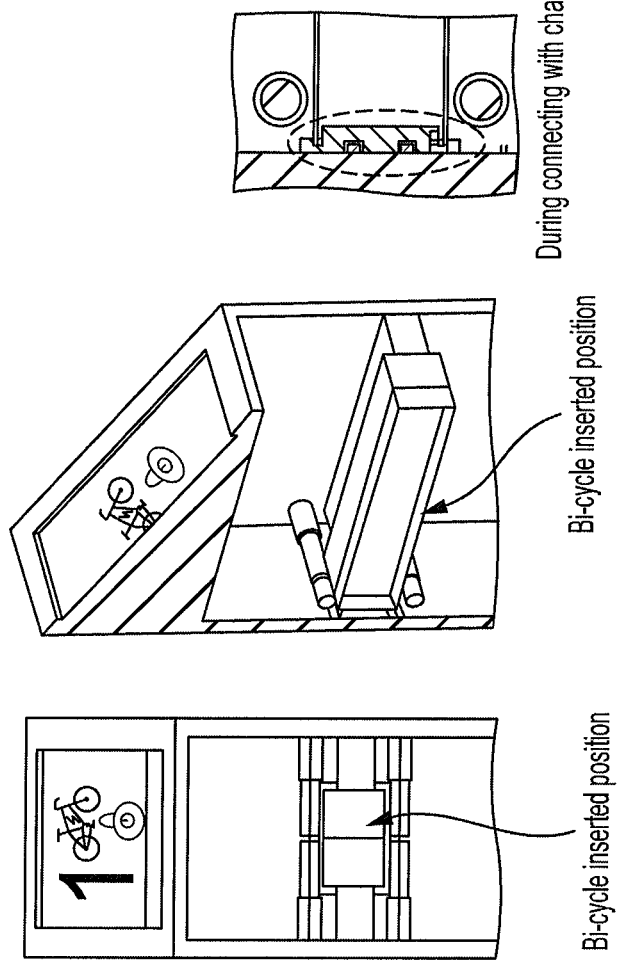
FIG. 20a is a front view of a light electric vehicle station according to the principles of the present invention.
Figure 20B:
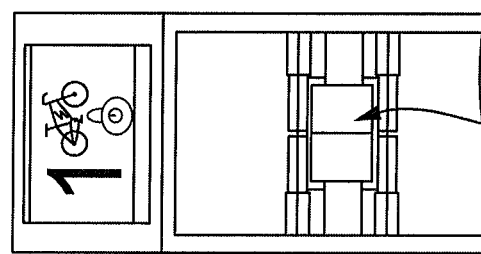
FIG. 20b is a front view of the station of FIG. 20a with a connecting interface of a light electric vehicle inserted in a holding structure of the station and locked into place with the locking mechanism.
Figure 20C:
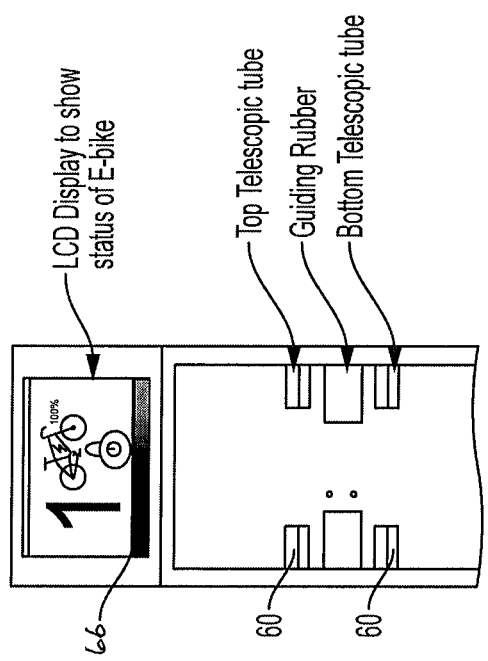
FIG. 20c is a cross-sectional isometric view of the station of FIG. 20b.
Figure 20D:
FIG. 20d is a cross-sectional side view of the station of FIG. 20b showing the detail of the connecting interface.

In one preferred and non-limiting embodiment, the station 26 may further be equipped with a power level indicator 66 reflecting the charge level of the bicycle 28 connected to it. An example of the power level indicator 66 is shown in FIGS. 20a and 22. The power level of the bicycle's battery may be detected through the data communication port 68 or through the electrical connectors 70 (FIG. 26) of the power outlet 36 that is connected to the battery via mating connector 64.

In one preferred and non-limiting embodiment, the controller 58 can be responsible to control the operation of the station 26 and at least some of its components such as, without limitation, the locking mechanism 34 and the power outlet 36. Each station 26 may comprise its own controller 58, which can then be remotely connected to a central computer or database to exchange information on the use of the bicycles 28 and on their users, or it may be a single controller 58 responsible for operating all of the stations 26 of a stowage portion of a rail vehicle 10 or of a train which the rail vehicle is part of. Communications between the single controller 58 and the plurality of stations 26 may be made by wireless communication, such as, for example, Bluetooth communication protocol, local Wifi, cellular communication, satellite communication, or, more simply, through the communication wiring of the train which the rail vehicle is part of. The controller 58 may also be remotely located, for example, in a central location, like at a train control office, and each station 26 may communicate with the train control office remotely via the controller 58.

In one preferred and non-limiting embodiment, the controller 58 may communicate with a payment module 76 configured to process a payment for the rental of one of the bicycles 28. The payment module can be on-board the rail vehicle 10 (or train that the rail vehicle 10 is part of) or can be remote from the rail vehicle/train, e.g., at a train office.

In one preferred and non-limiting embodiment, the controller 58 can control the operation of the locking mechanism 34, in particular the release of the moveable tab 56, as well as that of the power outlet 36. Operation of the power outlet 36 may be based on information provided by the payment module (i.e., has the recharging been paid for?) and/or on information from the bicycle 28 obtained through the data communication port 68. Alternatively, this information can be gathered from the bicycle through wireless technologies, such as, without limitation RFID, Bluetooth, or Wifi. In another example, the payment module 76 may be located in the rail vehicle 10 or in the bike station 26 itself. The payment method may use technologies such as Apple Pay or any other contactless types of payment using a smartphone. Once the information that the payment has been made is received by the controller 58, the controller 58 may operate, possibly with a delay, the locking mechanism 34 so as to release the bicycle 28.

Figure 7:
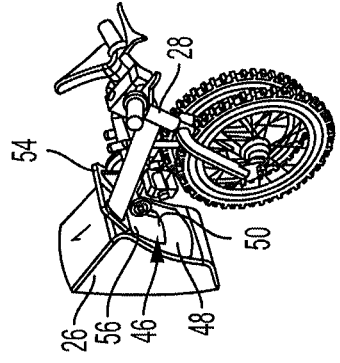
FIG. 7 is an isometric view of one of the stations of FIG. 4 with a foldable bicycle positioned for insertion in the station.
Figure 9:
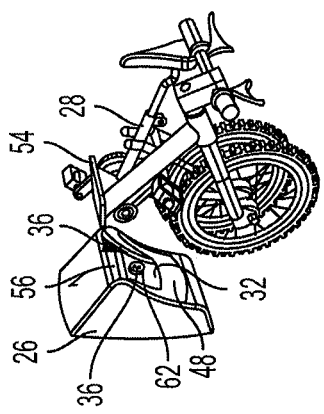
FIG. 9 is an isometric view of the station and foldable bicycle of FIG. 7 with the foldable bicycle halfway inserted in the station.
Figure 8:
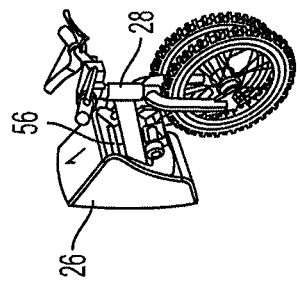
FIG. 8 is an isometric view of the station and foldable bicycle of FIG. 8 with the foldable bicycle starting its insertion in the station.
Figure 10:
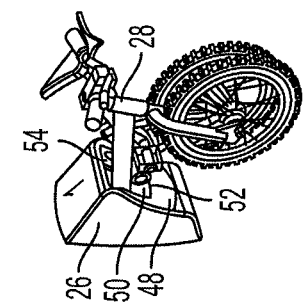
FIG. 10 is an isometric view of the station and foldable bicycle of FIG. 9 with the foldable bicycle fully inserted in the station.
Figure 11:
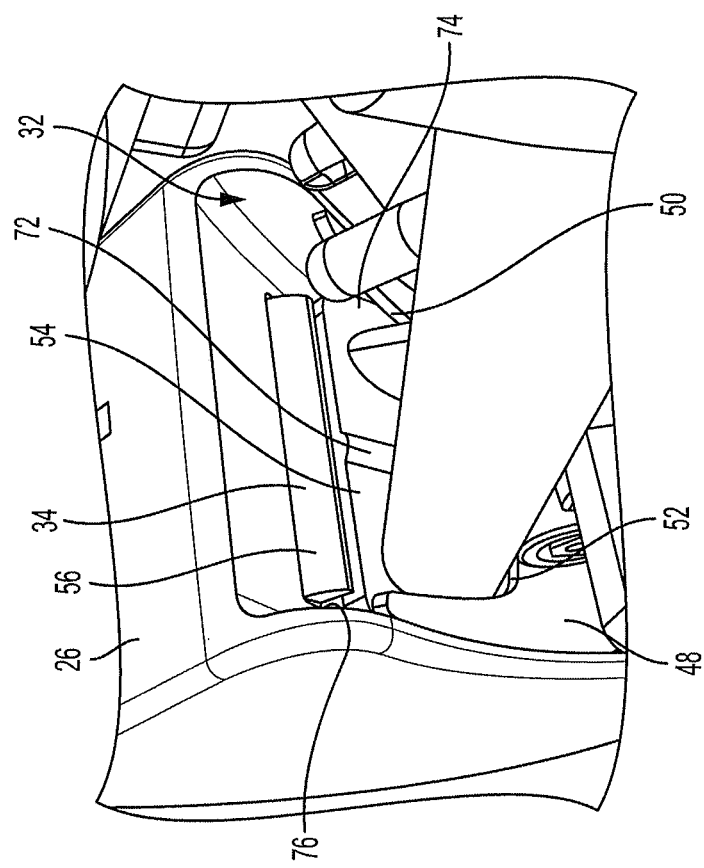
FIG. 11 is an isometric view of the station and foldable bicycle of FIG. 10 showing detail of a bicycle connecting interface inserted and locked in the station.

Referring now to FIGS. 7, 8, 9, 10, 11, and 12, in one preferred and non-limiting embodiment, in use, the bicycle 28, e.g., of a foldable type that may be stored in a compact space, is first folded at a hinge 72 (FIG. 11) thereof, thereby exposing the matching or mating connector 64 (FIG. 18b) as well as exposing a flange 74 (FIG. 11) of the grabbing portion 54. As shown in FIG. 7, the grabbing portion 54 is aligned with the notch 50 (FIG. 8) in the cover 48 of the holding structure 32. In FIG. 8, the grabbing portion 54 is lowered in the recess 46 behind the cover 48 until the top of the grabbing portion 54 touches the moveable tab 56 of the locking mechanism 34. As the moveable tab 56 is designed with a chamfer 76 (FIG. 11), the locking mechanism 34 may be designed so that the moveable tab 56 may be pushed away when the station 26 is empty. FIG. 8 shows the grabbing portion 54 sliding over the moveable tab 56 on its way to the receiving portion 52 at the bottom of the notch 50. In FIG. 9, the grabbing portion 54 has now reached the receiving portion 52 at the bottom of the notch 50 so that the cover 48 retains the flange 74 (FIG. 11) of the grabbing portion 54 against or in the recess 46 in a first axis (say depth Z) while the notch 50 prevents the flange 74 and, therefore, the bicycle 28 from moving along a second axis (say laterally Y) and while the flange 74 is secured in a third direction (say an axis X normal to receiving portion 52) both by the receiving portion 52 and the moveable tab 56, which deploys behind the top of the flange 74 (FIG. 11) once the grabbing portion 54 moves past the flange 74. As the grabbing portion 54 moves into the position shown in FIG. 10, the matching or mating connector 64 connects with the connector 62. FIG. 10 depicts the bicycle 28 in its locked and connected position. FIG. 11 shows a close-up of the grabbing portion 54 in this same position.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A rail vehicle adapted to travel on one or two rails, the rail vehicle comprising:
a car body, said car body being supported by wheels adapted to roll along said one or two rails, said car body having a passenger space and a stowage space, said passenger space being adapted to accommodate passengers, said stowage space having a station for accommodating light electric vehicles, said stations having:

a chassis;

a holding structure, said holding structure being operative to hold said light electric vehicle stationary, said holding structure comprises a recess in a surface of said chassis and a cover partially covering said recess, said cover having a notch with a receiving portion adapted to receive a grabbing portion exposed on a folded frame of a light electric vehicle;

a locking mechanism, said locking mechanism being operative to retain the light electric vehicle in said holding structure;

a power outlet, said power outlet being operative to deliver electrical power to a battery of the light electric vehicle via charging pins on the grabbing portion of the light electric vehicle when the light electric vehicle is secured in said holding structure and connected to said power outlet, said power outlet being connected to an electrical power network of said rail vehicle; and a controller, said controller being operative to selectively send a release signal to said locking mechanism so as to release said locking mechanism, said controller being further operative to selectively operate said power outlet so as to deliver the electrical power.

2. The rail vehicle of claim 1 further comprising a plurality of said station, said plurality of stations being aligned along a first sidewall of said car body.

3. The rail vehicle of claim 2 further comprising a passenger seat portion located on a second sidewall opposed to said first sidewall, said plurality of stations taking up a length of space along said first sidewall corresponding substantially to a length of said passenger seat portion.

4. The rail vehicle of claim 1, wherein said stowage space takes up at least a portion of a first side of said car body.

5. The rail vehicle of claim 1, wherein said receiving portion is located at least 50 cm above a floor of said car body.

6. The rail vehicle of claim 1, wherein said power outlet is located in said recess.

7. The rail vehicle of claim 1, wherein the locking mechanism comprises a moveable tab, said tab being located in said recess, said tab being operative to prevent the light electric vehicle from escaping said receiving portion of said notch absent said release signal.

8. The rail vehicle of claim 1, wherein said notch is at least 60 mm wide in said receiving portion.

9. The rail vehicle of claim 8, wherein said notch is at least 75 mm wide in said receiving portion.

10. The rail vehicle of claim 1, wherein the locking mechanism comprises a telescoping tube operative to lock said light electric vehicle.

11. The rail vehicle of claim 1, wherein said power outlet is identical for all of said plurality of stations.

12. The rail vehicle of claim 11, wherein said power outlet comprises a standard charging connector.

13. The rail vehicle of claim 1, wherein said power outlet further comprises a data communication port operative to communicate with the light electric vehicle.

14. The rail vehicle of claim 1, wherein said station further comprises a power level indicator, said power level indicator being operative to reflect a power level of the light electric vehicle connected to said station.

15. The rail vehicle of claim 1, wherein said controller is operative to communicate with a payment module operative to process a payment, said operation of said locking mechanism and of said power outlet by said controller being based on information provided by said payment module.

16. The rail vehicle of claim 15 further comprising said payment module.

17. The rail vehicle of claim 1, wherein said light electric vehicle is an electric bicycle and wherein each one of said plurality of stations are bicycle stations.

18. The rail vehicle of claim 1, wherein said light electric vehicle is an electric scooter and wherein each one of said plurality of stations are scooter stations.

* * * * *